US012149536B2

(12) United States Patent
Soneda

(10) Patent No.: US 12,149,536 B2
(45) Date of Patent: Nov. 19, 2024

(54) SERVICE PROVIDING SYSTEM, INFORMATION PROCESSING SYSTEM, AND USE PERMISSION ASSIGNING METHOD

(71) Applicant: Takuya Soneda, Kanagawa (JP)

(72) Inventor: Takuya Soneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 772 days.

(21) Appl. No.: 17/234,931

(22) Filed: Apr. 20, 2021

(65) Prior Publication Data

US 2021/0377277 A1 Dec. 2, 2021

(30) Foreign Application Priority Data

May 28, 2020 (JP) .................................. 2020-093442

(51) Int. Cl.
*H04L 9/40* (2022.01)
(52) U.S. Cl.
CPC .................. *H04L 63/104* (2013.01)
(58) Field of Classification Search
CPC ............................ H04L 63/104; H04L 63/102
See application file for complete search history.

(56) References Cited

U.S. PATENT DOCUMENTS

| 9,614,851 | B1 * | 4/2017 | Vevle ..................... H04L 63/104 |
| 11,012,445 | B1 * | 5/2021 | Jamison ................ H04W 12/08 |
| 11,675,927 | B2 * | 6/2023 | Aziz ...................... H04L 63/104 |
| | | | 726/26 |
| 11,848,936 | B2 * | 12/2023 | Gamache ............ H04L 63/0815 |
| 2002/0129135 | A1 * | 9/2002 | Delany .................. G06Q 10/06 |
| | | | 707/E17.005 |

(Continued)

FOREIGN PATENT DOCUMENTS

| JP | 2004-126642 | 4/2004 |
| JP | 2015-095051 | 5/2015 |

(Continued)

OTHER PUBLICATIONS

Chard, Kyle, et al. "Globus Nexus: Research identity, profile, and group management as a service." 2014 IEEE 10th International Conference on e-Science. vol. 1. IEEE, 2014. (Year: 2014).*

(Continued)

*Primary Examiner* — Theodore C Parsons
*Assistant Examiner* — Sameera Wickramasuriya
(74) *Attorney, Agent, or Firm* — IPUSA, PLLC

(57) ABSTRACT

A service providing system, an information processing system, and a use permission assigning method. The service providing system registers one or more users in one or more groups in a tenant, assigns application use permission to a specific group, assigns the application use permission assigned to the specific group to a user in the specific group, generates screen information for restricting an assignment of the application use permission to a user registered in other group in the tenant, the other group to whom the application is not assigned, displays a screen based on the screen information, permit use of the application to the user to whom the application use permission is assigned among users registered in the specific group, and restrict a user registered in the other group to use the application.

13 Claims, 34 Drawing Sheets

(56) References Cited

U.S. PATENT DOCUMENTS

| | | | | |
|---|---|---|---|---|
| 2013/0254401 A1* | 9/2013 | Marshall | ............... | H04L 63/107 |
| | | | | 709/226 |
| 2014/0245373 A1* | 8/2014 | Martin | .................... | H04W 4/08 |
| | | | | 726/1 |
| 2014/0343989 A1* | 11/2014 | Martini | ................. | H04L 63/104 |
| | | | | 705/7.17 |
| 2015/0120784 A1* | 4/2015 | Satoh | .................... | G06F 21/105 |
| | | | | 707/802 |
| 2015/0127174 A1* | 5/2015 | Quam | ..................... | H04L 67/10 |
| | | | | 700/275 |
| 2017/0126742 A1* | 5/2017 | Hopkins | ................. | H04L 47/70 |
| 2017/0147157 A1* | 5/2017 | Shah | ..................... | H04W 12/37 |
| 2017/0295183 A1* | 10/2017 | Movsisyan | ........... | H04L 63/105 |
| 2018/0205825 A1* | 7/2018 | Vymenets | ........... | H04M 3/5175 |
| 2019/0007415 A1* | 1/2019 | Kliger | .................... | H04L 63/104 |
| 2019/0012742 A1* | 1/2019 | Quezada | .............. | H04L 63/102 |
| 2019/0028514 A1* | 1/2019 | Barboi | .................... | H04L 63/20 |

FOREIGN PATENT DOCUMENTS

| | | |
|---|---|---|
| JP | 2015-111407 | 6/2015 |
| JP | 2018-063580 | 4/2018 |

OTHER PUBLICATIONS

Weissman, Craig D., and Steve Bobrowski. "The design of the force.com multitenant internet application development platform." Proceedings of the 2009 ACM SIGMOD International Conference on Management of data. 2009. (Year: 2009).*

Japanese Office Action for 2020-093442 mailed on Mar. 5, 2024.

* cited by examiner

FIG. 17

Group Management (User)

Administrator Mode ON admin
Tenant ID :0123456789

←Top

| Group Management (User) | | |
|---|---|---|
| User ~351 | General ~352 | Administrator ~353 |
| admin (Administrator)<br>a@sample.com | ☑ ~354 | ☑ |
| hanako (Hanako)<br>b@sample.com | ☑ | ☐ |
| taro (Taro)<br>c@sample.com | ☑ | ☐ |
| User A | ☑ | ☐ |
| User B | ☐ | ☐ |
| User C | ☐ | ☐ |
| User D | ☐ | ☐ |
| User E | ☐ | ☐ |
| User F | — ~355 | — |
| User G | — | — |

Cancel  Save

◁ 1-5/20  Group ▷

Figure 18:
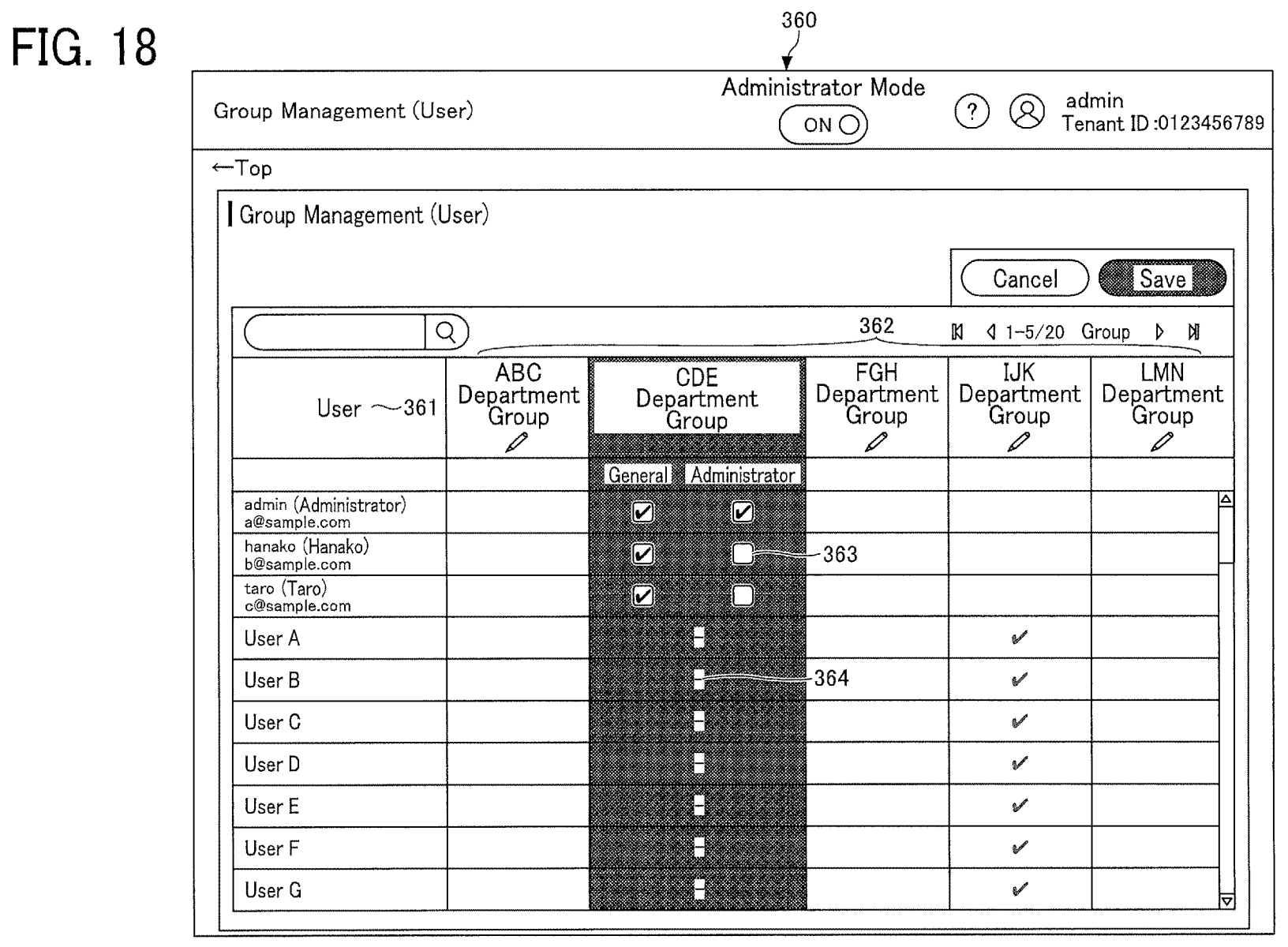

Group Management (User)

Administrator Mode ON ◯ admin
Tenant ID:0123456789

←Top

| Group Management (User) | | | | | |
|---|---|---|---|---|---|
| User ~361 | ABC Department Group ✎ | CDE Department Group | FGH Department Group ✎ | IJK Department Group ✎ | LMN Department Group ✎ |
| | | General / Administrator | 362 | | |
| admin (Administrator) a@sample.com | | ✓ / ✓ | | | |
| hanako (Hanako) b@sample.com | | ✓ / □ ~363 | | | |
| taro (Taro) c@sample.com | | ✓ / □ | | | |
| User A | | ■ | | | |
| User B | | ■ ~364 | | ✓ | |
| User C | | ■ | | ✓ | |
| User D | | ■ | | ✓ | |
| User E | | ■ | | ✓ | |
| User F | | ■ | | ✓ | |
| User G | | ■ | | ✓ | |

360

Cancel  Save
◁ 1-5/20 Group ▷

FIG. 22

| Group Management (Device) | | Administrator Mode ON ⓘ ⓠ admin Tenant ID:0123456789 |
|---|---|---|

←Top

Group Management (Device)

| Device Name ~371 🔍 | ABC Department Group ~372 | Cancel  Save |
|---|---|---|
| Device A | ☑ | |
| Device B | ☑ | |
| Device C | ☑ ~373 | |
| Device D | ☑ | |
| Device E | ☐ | |
| Device F | ☐ | |
| Device G | ☐ | |
| Device H | ☐ | |
| Device I | - ~374 | |
| Device J | - | |

| Device Name 381 | ABC Department Group | CDE Department Group | FGH Department Group | IJK Department Group | LMN Department Group |
|---|---|---|---|---|---|
| Device A | | ✓ | | | |
| Device B | | ✓ | | | |
| Device C | | ☐ 383 | | | |
| Device D | | ▪ 384 | | | ↘ |
| Device E | | ▪ | | | ↘ |
| Device F | | ▪ | | | ↘ |
| Device G | | ▪ | | | ↘ |
| Device H | | ▪ | | | ↘ |
| Device I | | ▪ | | | ↘ |
| Device J | | ▪ | | | ↘ |

FIG. 26

Group Management (License)

Administrator Mode ON ⊙  ? ⊙  admin  Tenant ID:0123456789

← Top

| Group Management (License) |

390

🔍

Cancel  Save

◁ 1-5/20 Group ▷

ABC Department Group ~392

| License Name ~391 | |
|---|---|
| Application A | ☑ |
| Application B | ☑ ~393 |
| Application C | ☑ |
| Application D | ☑ |
| Application E | ☐ |
| Application F | ☐ |
| Application G | ☐ |
| Application H | ☐ |
| Application I | - ~394 |
| Application J | - |

FIG. 27

Group Management (License)

Administrator Mode ON ◯  ? ⊗ admin Tenant ID:0123456789

←Top

| Group Management (License) | | | | | |
|---|---|---|---|---|---|
| License Name (421) | ABC Department Group ✎ | CDE Department Group ✎ | FGH Department Group ✎ | IJK Department Group ✎ | LMN Department Group ✎ |
| Application A | | ✓ | | | |
| Application B | | ✓ | | | |
| Application C | | ☐ | | | |
| Application D | | ▪ | | | |
| Application E | | ▪ | | ✓ | |
| Application F | | ▪ | | ✓ | |
| Application G | | ▪ | | ✓ | |
| Application H | | ▪ | | ✓ | |
| Application I | | ▪ | | ✓ | |
| Application J | | ▪ | | ✓ | |

Cancel  Save

|◁ ◁ 1-5/20 Group ▷ ▷|

| USER ~431 | Application A ✎ | Application B ✎ | Application C ✎ | Application D ✎ | Application E |
|---|---|---|---|---|---|
| Registered Users: 20 | 2/10 | 4/30 | 0/30 | 10/30 | 0/30 |
| admin (Administrator) a@sample.com | ✓ | ✓ | – | ✓ | – |
| hanako (Hanako) b@sample.com | ✓ | ✓ | – | ✓ | – |
| taro (Taro) c@sample.com | | ☐ | – | ✓ | – |

Group Management (Permission) — Administrator Mode ON ○ — admin Tenant ID:0123456789

← Top
Group Management (License Use Permission Assignment)
ABC Department Group 430, 431, 432, 433, 434, 435

FIG. 34

| User ~441 | Application A (ABC Department Group) 2/10 | Application B (ABC Department Group) All ☑ ⇔ ☐ 4/30 | Application C (DEF Department Group) 0/30 | Application D (ABC Department Group) 10/30 | Application E (No change in group) 0/30 |
|---|---|---|---|---|---|
| Registered Users: 20 | | | | | |
| admin (Administrator) a@sample.com | ✓ | ☑ ←443 | – | ✓ | – |
| hanako (Hanako) b@sample.com | ✓ | ☑ | – | ✓ | – |
| taro (Taro) c@sample.com | – | ☐ ←444 | – | ✓ | – |
| User A | – | ☐ | – | – | – |
| User B | – | ☐ | – | – | – |
| User C | – | ☐ | – | – | – |
| User D | – | ☐ | – | – | – |
| User E | – | ☐ | – | – | – |
| User F | – | ☐ | – | – | – |
| User G | – | ☐ | – | – | – |

Permission Management (User)    Administrator Mode ON    admin  Tenant ID:0123456789

←Top

■ Application Use Permission Management (User)
To edit use permission, press "✎" and turn on or off "✓".

442

Cancel    Save    1-5/20 Application

SERVICE PROVIDING SYSTEM, INFORMATION PROCESSING SYSTEM, AND USE PERMISSION ASSIGNING METHOD

CROSS-REFERENCE TO RELATED APPLICATIONS

This patent application is based on and claims priority pursuant to 35 U.S.C. § 119(a) to Japanese Patent Application No. 2020-093442, filed on May 28, 2020, in the Japan Patent Office, the entire disclosure of which is hereby incorporated by reference herein.

BACKGROUND

Technical Field

The present disclosure relates to a service providing system, an information processing system, and a use permission assigning method.

Related Art

Information processing systems that provide services such as applications and software to users through network are known. By preparing a certain environment, for example, a terminal device such as a PC (personal computer) or an electronic device and a web browser operating on the terminal device, the user uses the service provided by the service providing system as an application from the terminal device.

In some cases, a company, or the like contracts a service provided by such a service providing system as an organization, and a member of the organization or the like uses the service as a user. The organizations that have contracted services are managed in a unit called tenant. The users or the electronic devices belonging to the tenant can use the service within a scope of license assigned by the contract.

SUMMARY

Embodiments of the present disclosure describe a service providing system, an information processing system, and a use permission assigning method. The service providing system registers one or more users in one or more groups in a tenant, assigns application use permission to a specific group, assigns the application use permission assigned to the specific group to a user in the specific group, generates screen information for restricting an assignment of the application use permission to a user registered in other group in the tenant, the other group to whom the application is not assigned, displays a screen based on the screen information, permit use of the application to the user to whom the application use permission is assigned among users registered in the specific group, and restrict a user registered in the other group to use the application.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a diagram illustrating an example of a home screen displayed by the first terminal device after a tenant administrator logs in;

FIG. 17 is a diagram illustrating an example of a group management (user) screen displayed by the first terminal device;

FIG. 18 is a diagram illustrating an example of a group administrator designation (for a plurality of groups) screen;

FIG. 22 is a diagram illustrating an example of a group management (device) screen displayed by the first terminal device;

FIG. 23 is a diagram illustrating an example of a group affiliated device (for a plurality of groups) management screen;

FIG. 26 is a diagram illustrating an example of a group management (license) screen displayed by the first terminal device;

FIG. 27 is a diagram illustrating an example of a group affiliated license (for a plurality of groups) management screen;

FIG. 30 is a diagram illustrating an example of a use permission assigning screen displayed by the third terminal device;

FIG. 34 is a diagram illustrating an example of the use permission assigning screen displayed by the first terminal device.

Figure 1A:
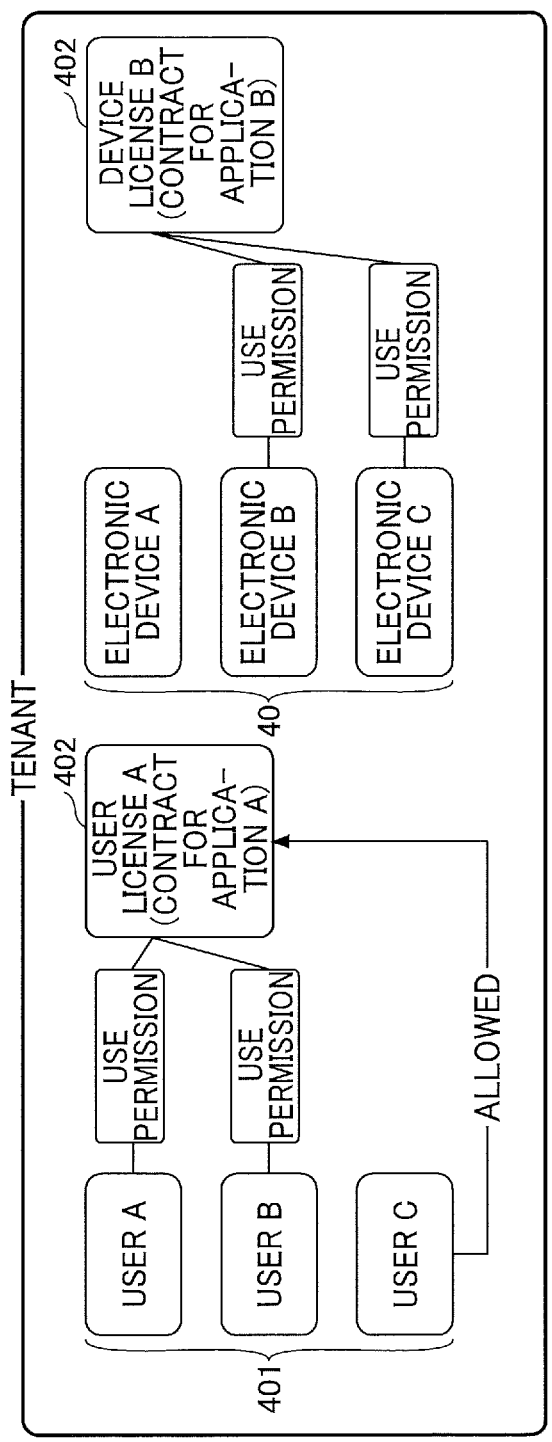
FIGS. 1A and 1B are diagrams illustrating a relationship between a tenant, users, electronic devices, and licenses.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of the embodiment for carrying out the present disclosure, the service providing system and the use permission assigning method performed by the service providing system is described.

Figure 1B:
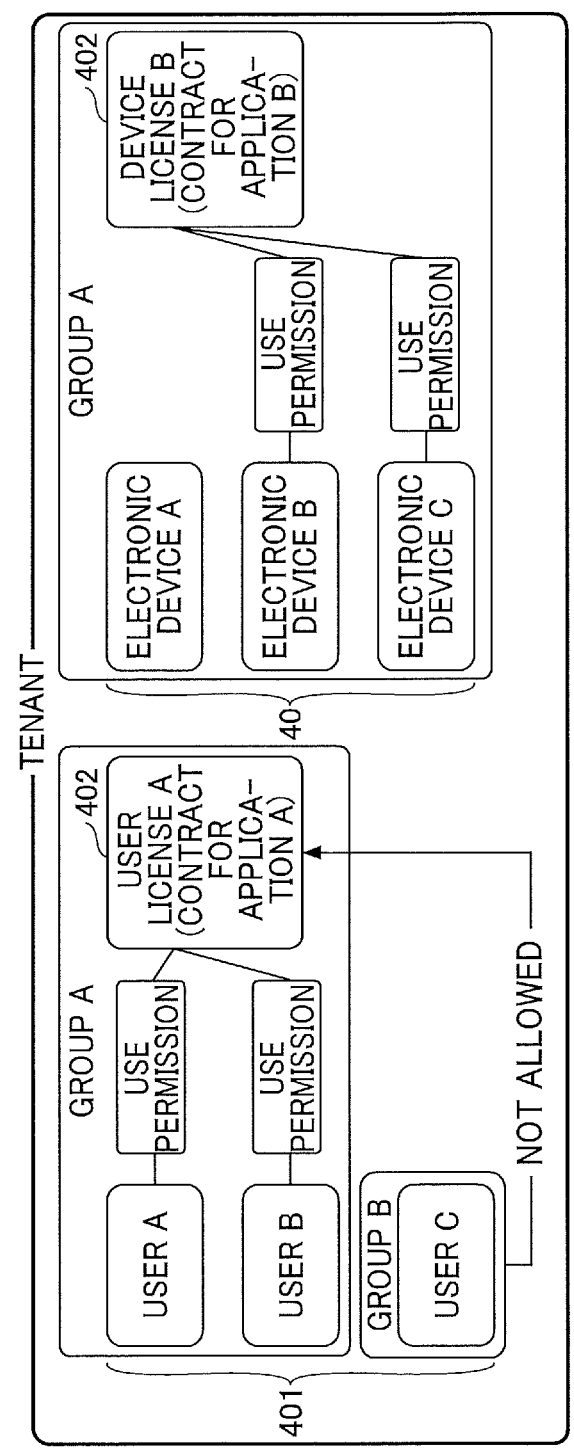

Relationships between tenants, users, electronic devices, and licenses are described with reference to FIG. 1A. FIG. 1A illustrates an example of a tenant data model. For example, in a case of the service providing system used by a company or the like in business, the service providing system is often managed in units of companies (organizations) from viewpoints of security and management cost. An information processing system described below can register users, electronic devices 40, and licenses in groups within the tenant. As illustrated in FIGS. 1A and 1B, there are tenants corresponding to each company, to which the user 401, the electronic device 40, and the license 402 belong. The license 402 is use permission of an application assigned by an application usage contract. The license may be called the application such as a web application or a device dedicated application. Hereinafter, when distinguishing each user 401, each electronic device 40, each license 402, and each application, uppercase letters of the alphabet is added for description.

Users A and B have the use permission assigned based on license A, and electronic devices B and C have the use permission assigned based on license B. There are two types of licenses: user license and device license.

In order for the user 401 and the electronic device 40 to use the application, the tenant concludes the contract with the service provider to use the application. The contract gives rise to license 402. Up to the number permitted by the license 402, the use permission is assigned to the user 401 and the electronic device 40. Which user or electronic device 40 can use which application is managed in the tenant.

When the user 401 or the electronic device 40 uses the application, usually the user or the electronic device 40 is authenticated by an authentication system. The authentication system determines success or failure of authentication by comparing user information and device information stored in a database or the like with the information included in an authentication request.

However, for example, even if application A is purchased for the user A and the user B of a certain development group, the tenant administrator may assign the use permission of the application A to the user C who is not in the same development group as the user A and the user B.

In the service providing system of the present embodiment, following configurations are adopted: —Create a group in the tenant and assign license use permission on a group-by-group basis, —Create a group in the tenant and limit the license usage range within the group.

FIG. 1B illustrates an example of a tenant data model of the present embodiment. In FIG. 1B, users A and B, electronic devices A, B, and C belong to group A, and user C belongs to group B. For example, when license A is contracted for group A, the tenant administrator is restricted from assigning the use permission for license A to user C. In addition, the tenant administrator can assign the license use permission to users A and B of group A on a group-by-group basis.

Among the users registered in the group A, the information processing system permits the users A and B to which the use permission of the application A is assigned to use the application A and user C registered in another group B is not allowed to use the application A.

As described above, in the service providing system of the present embodiment, the user or the electronic device belonging to a group holding the license is permitted to use the application. Therefore, the use permission can be managed for each group in the tenant.

A tenant indicates a customer who shares the same software among a plurality of customers, such as a company or the like which is a group of customers. Each user in the tenant can use the application contracted by the tenant, and the tenant administrator of the tenant can assign the use permission for multiple software instances (applications and packages that combine multiple applications) that exist in the system to the user.

The application is a program executed by the terminal device and the information processing apparatus in order for a user to receive a service. The program executed by the terminal device and the information processing apparatus in cooperation is also called a web application. The application may be, for example, a workflow application that executes a series of processes in order. The application can be built by tenant administrators, etc. by combining components. For example, an application that uploads and saves a document read by the electronic device 40 to a storage on the cloud may be built by combining a document reading component, a document transmitting component, and the like. The application may also be licensed as the package described above. In this case, the application package and the application are treated the same.

A role is a function within the tenant. The role has the right granted according to the role. For example, the tenant administrator decides the role by considering user's job category, position, and usage of the application. Not only when the user's role and the application's role match, but when the user's role has broader authority than the application's role, the application use permission may be assigned to the user.

A device indicates the electronic device 40, and in the present embodiment, the electronic device 40 may be referred to as the device.

The group is an assemblage of elements. In the present embodiment, one or more users or electronic devices 40 are elements of the group.

The restriction on the assignment of use permission indicates that the assignment of use permission is possible only within a certain range. The restriction may be called prohibition. In addition, the restriction may include the case where the prohibited state is released by some operation.

Figure 2:
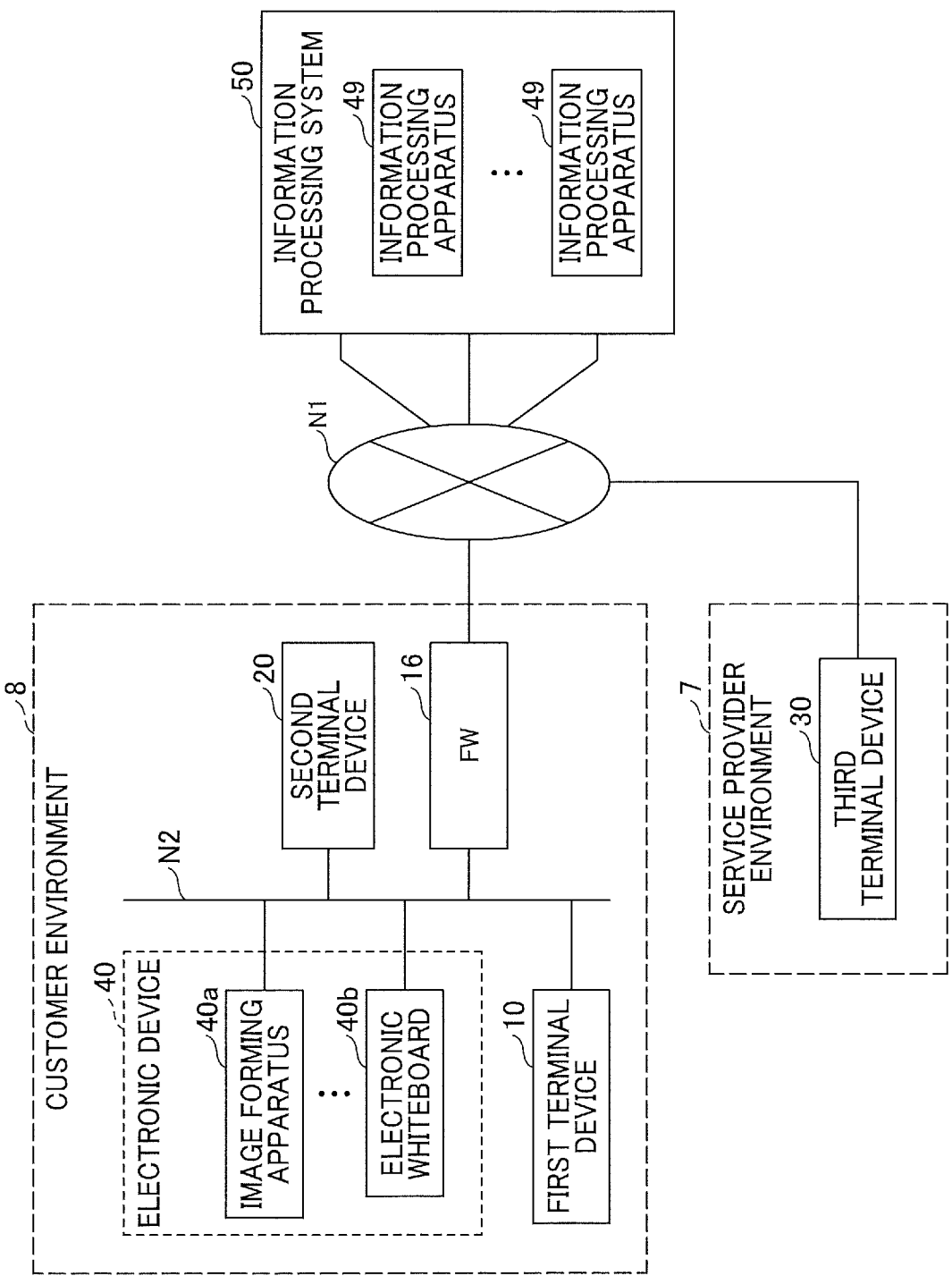
FIG. 2 is a block diagram illustrating a system configuration of an example of a service providing system.

FIG. 2 is a block diagram illustrating an example of a configuration of a service providing system 1 according to the present embodiment. In the service providing system 1 of FIG. 2, the customer environment 8 and the service provider environment 7 are connected to the information processing system 50 through a network N1 such as the internet. The network N1 also includes a telephone network such as a mobile phone network.

A customer is a customer of a service provided by the information processing system 50, and includes an organization such as a company, a body, an educational institution, an administrative organization, or a department. Those who have some kind of employment relationship with the customer are users. In the customer environment 8, one or more electronic devices 40, a first terminal device 10, a second terminal device 20, and a firewall (FW) 16 are connected through a network N2 such as a local area network (LAN). Further, the information processing system 50 includes one or more information processing apparatuses 49 connected to the network N1. A service provider is a provider of services to the customers. A third terminal device 30 is included in the service provider environment 7.

The electronic device 40 is, for example, an image forming apparatus 40*a*, and the image forming apparatus 40*a* includes a laser printer, a multifunction printer (MFP), and the like. Further, as the electronic device 40, an electronic whiteboard 40*b* may also be mentioned. In addition, the electronic device 40 includes, for example, an output device such as a projector (PJ), a digital signage, a head up display (HUD) device, an industrial machine, an imaging device, a sound collecting device, a medical device, a network home appliance, and an automobile (a connected car), a notebook PC, a mobile phone, a smartphone, a tablet terminal, a game machine, a personal digital assistant (PDA), a digital camera, a wearable PC, a desktop PC, or the like.

The electronic device 40 of the present embodiment is a terminal on which the user registered in the information processing system 50 uses the service. The user logs in to the information processing system 50 from the electronic device 40, selects an application (application program) for which the user has the use permission, and receives the service provided by the information processing system 50. As described above, the service is provided on an application by application basis.

The first terminal device 10 is an information processing apparatus such as the smartphone, the mobile phone, the tablet PC, the desktop PC, or the notebook PC used by the tenant administrator. The first terminal device 10 is installed with a program including a screen display function such as a web browser. The program is not limited to the web browser as long as the program includes a function of displaying the screen information received from the information processing system 50 as a screen. A program dedicated to the information processing system 50 may be used.

The second terminal device 20 is an information processing apparatus such as the smartphone, the mobile phone, the tablet PC, the desktop PC, or the notebook PC used by the user. The second terminal device 20 is installed with a program including the screen display function such as the web browser. The program is not limited to the web browser as long as the program includes a function of displaying the screen information received from the information processing system 50 as a screen. A program dedicated to the information processing system 50 may be used.

The third terminal device 30 is an information processing apparatus such as the smartphone, the mobile phone, the tablet PC, the desktop PC, the notebook PC, etc. used by a staff member (person in charge of operating the service providing system). The third terminal device 30 is installed with a program including the screen display function such as the web browser. The program is not limited to the web browser as long as the program includes a function of displaying screen information received from the information processing apparatus as a screen. A program dedicated to the information processing system 50 may be used.

The firewall 16 is a device for preventing intrusion from the outside into the customer environment 8, and all communications from the customer environment 8 are monitored by the firewall 16. However, the above description does not apply when the first terminal device 10, the second terminal device 20, or the third terminal device 30 communicates with the information processing system 50 through the telephone network such as the mobile phone network.

The information processing system 50 provides various services to the electronic device 40, the second terminal device 20, and the like. The services vary depending on type of the electronic device 40. In the case of the image forming apparatus 40*a*, the services include uploading and saving a scanned document to the storage on the cloud and downloading and printing image data of the storage on the cloud, but the service are not limited to the services described here. In the case of the electronic whiteboard 40*b*, for example, the services include recognizing voice in real time and creating minutes, converting handwritten data into text, and the like. In the case of the second terminal device 20, for example, the services include a real-time translation service for web pages.

In the information processing system 50, the tenant and the user are associated with each other. The services (applications) that can be used are determined according to the role of the user, and the user uses the application that the user can use from the electronic device 40 or the second terminal device 20. In addition, tenants, tenant administrators, and users have the following relationships. One customer has one tenant. In this case, the tenant administrator and the user belong to one tenant. One customer has multiple tenants. In this case, the tenant administrators do not necessarily belong to the tenants, but manage the users belonging to each tenant. The users belong to one or more tenants. In either case, a user registered in the information processing system 50 belongs to any of the tenants, so if the user is identified after registration, the tenant to which the user belongs is also identified. In the case of one customer having one tenant, if the tenant administrator logs in to the tenant, the tenant is automatically determined. (The tenant does not have to be designated.) In the case of one customer having multiple tenants, the tenant administrator should designate the tenant at login (or each tenant has a different account).

The information processing system 50 creates screen information of a web page to be displayed on the first terminal device 10, the second terminal device 20, the third terminal device 30, or the electronic device 40, and transmits the screen information to the first terminal device 10, the second terminal device 20, the third terminal device 30, or the electronic device 40. For example, the home screen or the like, which is described below, is displayed.

The screen information is created by Hypertext Markup Language (HTML), Extensible Markup Language (XML), Cascade Style Sheet (CSS), JAVASCRIPT (registered trademark), and the like. The web page may be provided by a web application. The web application refers to software or a mechanism that is executed on the web browser and operates by coordinating a program in a programming language (for example, JAVASCRIPT (registered trademark)) that operates on the web browser with a program on the web server. The web page can be dynamically changed by the web application.

The information processing system 50 may be compatible with cloud computing. Cloud computing refers to a usage pattern in which resources on a network are used without being aware of specific hardware resources. The information processing system 50 that supports cloud computing may be referred to as a cloud system. The cloud system may be on the internet or on-premises.

The configuration of the service providing system 1 illustrated in FIG. 2 is an example, and one or more servers (proxy server, gateway server, etc.) may be interposed between the customer environment and the information processing apparatus. The first terminal device 10 and the second terminal device 20 may be in an environment other than the customer environment, and may be connected to, for example, the network N1. The third terminal device 30 may be in an environment other than the service provider environment, and may be connected to, for example, the network N1.

The information processing system 50 may be implemented by one information processing apparatus 49 or may be distributed and implemented by a plurality of information processing apparatuses 49. For example, each service may be provided by one information processing apparatus 49, one information processing apparatus 49 may provide a plurality of services, or a plurality of information processing apparatuses 49 may provide one service.

In the service providing system 1 of FIG. 2, the information processing apparatus is connected to the network N1 such as the internet outside the customer environment. In other words, the service providing system 1 of FIG. 2 is an example in which the information processing system 50 is provided in a cloud environment. However, the information processing system 50 may be provided inside the customer environment (on-premises environment).

Figure 3:
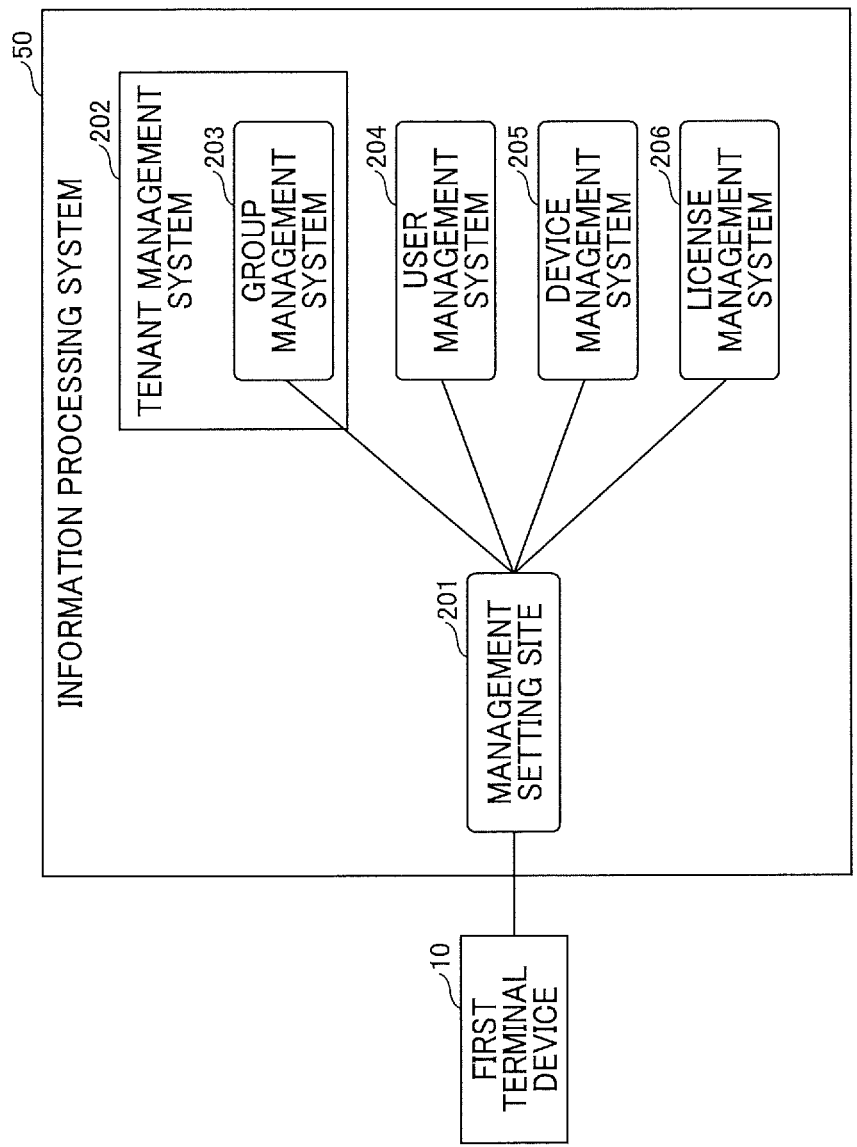
FIG. 3 is a block diagram illustrating a detailed system configuration of an example of an information processing system.

FIG. 3 is a block diagram illustrating a detailed system configuration of an example of an information processing system 50. The information processing system 50 includes a management setting site 201, a tenant management system 202, a user management system 204, a device management system 205, and a license management system 206.

The management setting site 201 is a web server that provides a web site for accepting settings related to users, electronic devices 40, licenses, and groups. The tenant administrator connects the first terminal device 10 to the management setting site 201 and makes various settings through the first terminal device 10.

The tenant management system 202 is one or more information processing apparatuses that manage tenants. The tenant management system 202 includes a group management system 203. The group management system 203 is one or more information processing apparatuses that provide a group management function described below. The tenant management system 202 and the group management system 203 may be mounted on separate information processing apparatuses.

A user management system is one or more information processing apparatuses that manage users in a tenant. The device management system 205 is one or more information processing apparatuses that manage the electronic devices 40 in the tenant. The license management system 206 is one or more information processing apparatuses that manage the license contracted by the tenant and the use permission associated with the license.

The management setting site 201, the tenant management system 202, the user management system 204, the device management system 205, and the license management system 206 are not limited to the configuration implemented by separate information processing apparatuses as illustrated in FIG. 3, and may be implemented by a smaller number of information processing apparatuses.

Figure 4:
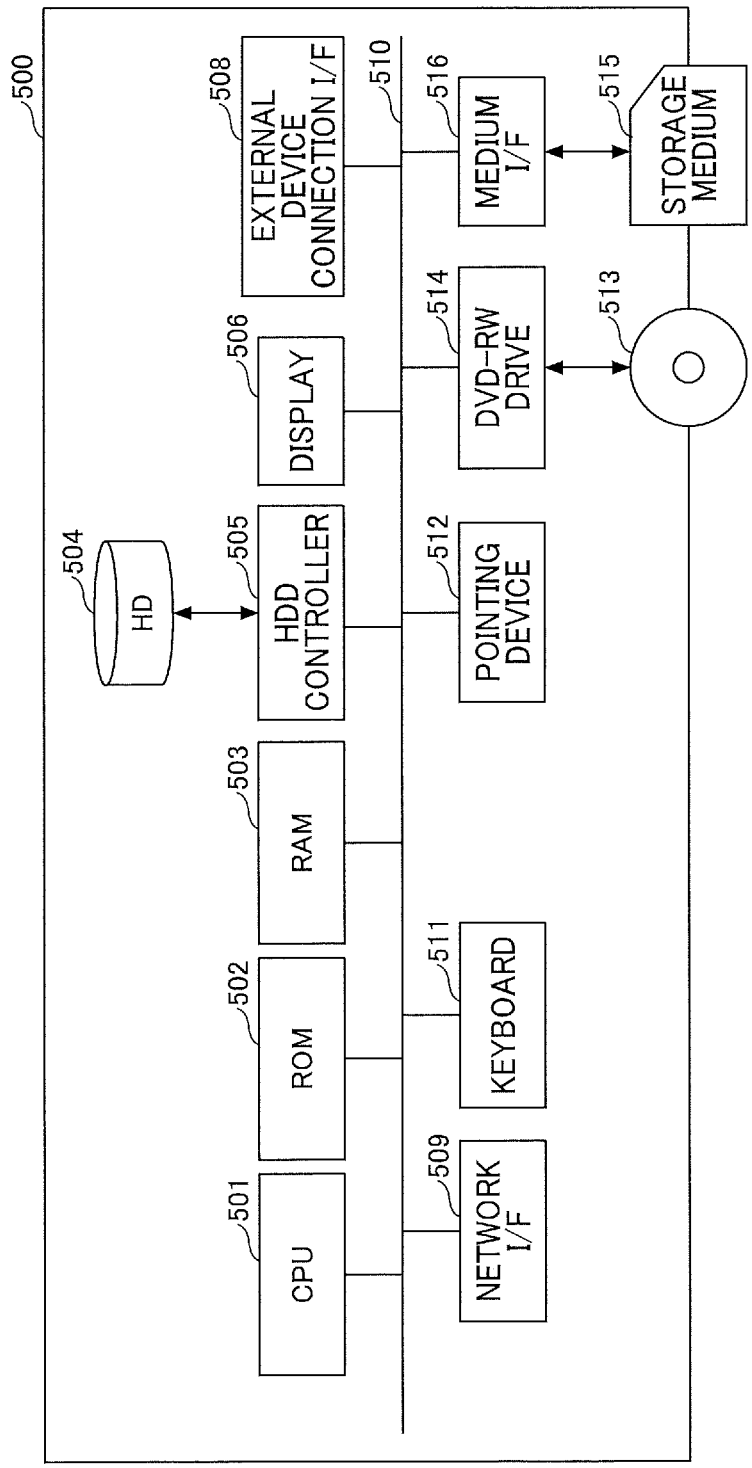
FIG. 4 is a block diagram illustrating a hardware configuration of an example of a computer.

The first terminal device 10, the second terminal device 20, the third terminal device 30, or the information processing system 50 of FIG. 2 is implemented by, for example, a computer having a hardware configuration illustrated in FIG. 4. FIG. 4 is a block diagram illustrating an example of a hardware configuration of the computer. The computer 500 of FIG. 4 is implemented by the computer as illustrated in FIG. 4 including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514 and a medium I/F 516.

Among these elements, the CPU 501 controls entire operation of the computer. The ROM 502 stores a program such as an initial program loader (IPL) used for driving the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using a communication network. The bus line 510 is an address bus, a data bus, or the like for electrically connecting each component such as the CPU 501 illustrated in FIG. 4.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading or writing (storage) of data to a storage medium 515 such as a flash memory.

Figure 5:
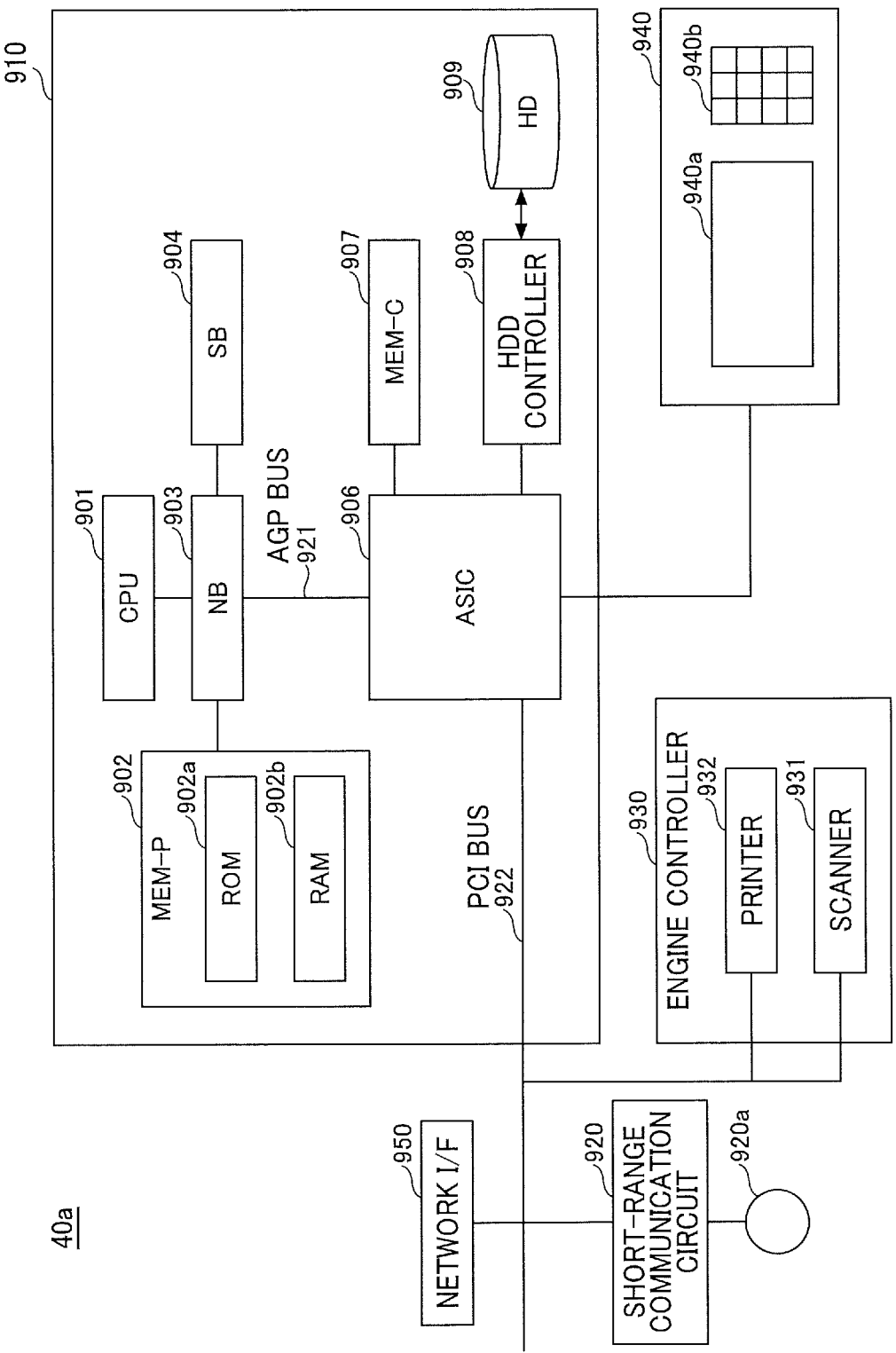
FIG. 5 is a block diagram illustrating a hardware configuration of an example of an image forming apparatus.

FIG. 5 is a block diagram illustrating a hardware configuration of an example of the image forming apparatus 40a. As illustrated in FIG. 5, the image forming apparatus 40a includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the image forming apparatus 40a. The NB 903 connects the CPU 901 with the MEM-P 902, SB 904, and AGP bus 921 and includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910 and further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

The engine controller 930 includes a scanner 931 and a printer 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls entire operation of the image forming apparatus 40a. For example, the controller 910 controls drawing, communication, or user inputs to the control panel 940. The scanner 931 or the printer 932 includes an image processing unit such as error diffusion processing and gamma conversion processing.

In response to an instruction to select a specific application through the control panel 940, for example, using a mode switch key, the image forming apparatus 40a selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile function is selected.

The network I/F 950 controls communication of data with an external device through the communication network. The short-range communication circuit 920 and the network I/F 950 are electrically connected to the ASIC 906 through the PCI bus 922.

Figure 6:
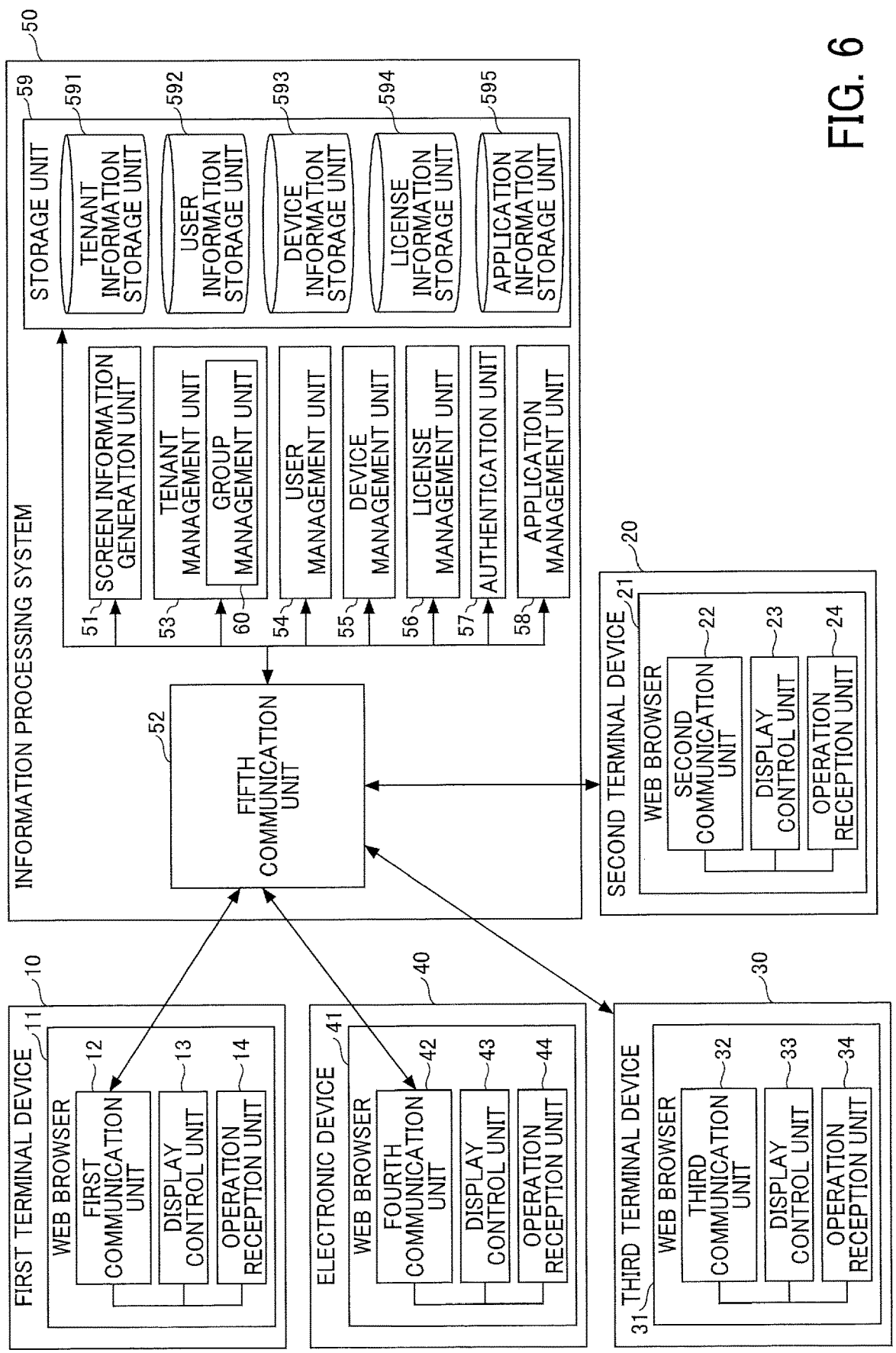
FIG. 6 is a block diagram illustrating functions of a first terminal device, a second terminal device, a third terminal device, the electronic device, and the information processing system.

The function of each device of the service providing system 1 according to the present embodiment is implemented by, for example, a functional block illustrated in FIG. 6. FIG. 6 is a block diagram illustrating the functions of the first terminal device 10, the second terminal device 20, the third terminal device 30, the electronic device 40, and the information processing system 50.

The first terminal device 10 includes a first communication unit 12, a display control unit 13, and an operation reception unit 14. The first terminal device 10 implements functions illustrated in FIG. 6 by executing a program (for example, a web browser 11).

The first communication unit 12 communicates with the information processing system 50 and receives screen information for the first terminal device 10 to display a home screen or the like, which is described below. In addition, information input by the tenant administrator on these screens is transmitted to the information processing system 50.

The display control unit 13 analyzes the screen information of the screen received from the information processing system 50 and displays, for example, the home screen or the like on the display 506. The operation reception unit 14 receives operation (input to each screen) of the tenant administrator for the first terminal device 10.

The second terminal device 20 includes a second communication unit 22, a display control unit 23, and an operation reception unit 24. The second terminal device 20 implements functions illustrated in FIG. 6 by executing a program (for example, a web browser 21).

The second communication unit 22 communicates with the information processing system 50 and receives screen information for displaying various screens on the second terminal device 20. In addition, information input by the users on these screens is transmitted to the information processing system 50.

The display control unit 23 analyzes the screen information of the screen received from the information processing system 50 and displays various screens on the display 506. The operation reception unit 24 receives the user's operation on the second terminal device 20.

The third terminal device 30 includes a third communication unit 32, a display control unit 33, and an operation reception unit 34. The third terminal device 30 implements functions illustrated in FIG. 6 by executing a program (for example, a web browser 31).

The third communication unit 32 communicates with the information processing system 50 and receives screen information for displaying various screens on the third terminal device 30. In addition, information input by the staff member on these screens is transmitted to the information processing system 50.

The display control unit 33 analyzes the screen information of the screen received from the information processing system 50 and displays various screens on the display 506. The operation reception unit 24 receives the operation of the staff member for the third terminal device 30.

The electronic device 40 includes a fourth communication unit 42, a display control unit 43, and an operation reception unit 44. The electronic device 40 implements functions illustrated in FIG. 6 by executing a program (for example, a web browser 41).

The fourth communication unit 42 communicates with the information processing system 50 to receive screen information for the electronic device 40 to display a standby screen, a launcher screen, a login screen, an application screen, and the like. In addition, information input by the user on the standby screen, the launcher screen, the login screen, and the application screen are transmitted to the information processing system 50.

The display control unit 43 analyzes the screen information of the screen received from the information processing system 50 and displays, for example, the standby screen, the launcher screen, the login screen, and the application screen on the control panel 940. The operation reception unit 44 receives user operations on the electronic device 40 (for example, launching a launcher, inputting authentication information, selecting an application, operating an application, etc.).

The information processing system 50 includes a screen information generation unit 51, a fifth communication unit 52, a tenant management unit 53, a user management unit 54, a device management unit 55, a license management unit 56, an authentication unit 57, and an application management unit 58. These functions of the information processing system 50 are functions implemented by the CPU 501 of the computer 500 illustrated in FIG. 4 executing a program developed from the HD 504 to the RAM 503.

The screen information generation unit 51, the tenant management unit 53, the user management unit 54, the device management unit 55, and the license management unit 56 correspond to the management setting site 201, the tenant management system 202, the user management system 204, management system 205 and the license management system 206 in FIG. 3. In FIG. 6, the information processing system 50 includes each system for the convenience of drawing or description.

The fifth communication unit 52 transmits and receives various information to and from the first terminal device 10, the second terminal device 20, the third terminal device 30, and the electronic device 40. For example, various screen information generated by the screen information generation unit 51 is transmitted to the first terminal device 10, the second terminal device 20, the third terminal device 30, and the electronic device 40. In addition, the information entered on these screens are received.

The screen information generation unit 51 generates the above screen information according to the operation contents of the first terminal device 10, the second terminal device 20, the third terminal device 30, and the electronic device 40.

The tenant management unit 53 manages tenant information related to the tenant and stores and acquires the tenant information in the tenant information storage unit 591, which is described below.

The user management unit 54 manages user information, registers the user information in the user information storage unit 592, which is described below, and acquires (reads) the user information from the user information storage unit 592.

The device management unit 55 manages device information, registers the device information in the device information storage unit 593, which is described below, and acquires (reads) the device information from the device information storage unit 593.

The license management unit 56 accepts the contract of the application and registers license information in the license information storage unit 594 described below. The license management unit 56 also manages the number of licenses and the expiration date.

The authentication unit 57 authenticates the staff member, the tenant administrator, and the general user, and determines whether the authentication succeeds or fails. Authentication refers to determining whether or not the person who requested the authentication is a legitimate authority. In the present embodiment, the authentication unit 57 determines whether to permit the use of the information processing system 50, and further, determines whether the person who requested the authentication is the staff member, the general user, or the tenant administrator. Successful authentication indicates that the information processing system 50 permits the staff member, the general user, or the tenant administrator to log in. A login is an authentication act to access system resources with pre-registered account information when using various services on the computer or the internet. The account information is a user identifier (ID) and a password, an integrated circuit (IC) card number, biometric authentication information, or the like.

The application management unit 58 manages each application, manages the default settings of the application for each user, and reflects the default settings in the application.

Further, the information processing system 50 includes a storage unit 59 implemented by the HD 504, the RAM 503, and the like illustrated in FIG. 4. The storage unit 59 includes a tenant information storage unit 591, a user information storage unit 592, a device information storage unit 593, a license information storage unit 594, and an application information storage unit 595.

TABLE 1

| Item | Description |
|---|---|
| Tenant ID | Identification information of tenant |
| Tenant name | Name of tenant |
| Registration date | Registration date of tenant |

Table 1 schematically illustrates the tenant information stored in the tenant information storage unit 591. The tenant information includes a tenant name and a registration date corresponding to a tenant ID. The tenant ID is identification information of the tenant. The tenant name is a name of the tenant, which is a company name, a department name, or the like. The registration date is the date that the tenant is registered.

TABLE 2

| Item | Description |
| --- | --- |
| Tenant ID | Identification information of tenant to which user belongs |
| User ID | U0123 |
| Password | xxxxxxxx |
| Last name | tokkyo |
| Name | taro |
| Email address | taro@sample.com |
| Display language (locale) | Japanese |
| Account status | Valid, invalid, or locked |
| Role | Administrator or general user |
| Application use permission | List of applications |

Table 2 schematically illustrates the user information stored in the user information storage unit 592. The user information is associated with the tenant ID. There are as many user information as there are users belonging to the tenant. Note that the users of the user information storage unit include the tenant administrator. User information is registered by the tenant administrator by connecting to the information processing system 50.

The user information includes the tenant ID, the user ID, the password, a last name, a name, an e-mail address, a display language (locale), account status, a role, and application use permission. The tenant ID is the identification information of the tenant to which the user belongs. The user ID is the user identification information. The password is confidential information of a user required for authentication. The last name is the surname of the user. The name is the name of the user. The email address is the user's email address. The display language (locale) is the language of characters displayed on the screen used by the user. The account status is status of an account which is a right for a user to log in to the information processing system 50. There are at least three states in the account status which are valid, invalid or account locked. If user information is temporarily registered, the user information is invalid, and the user information is validated by full registration. The tenant administrator can invalidate an account even after the account has been validated. Account lock is set when the user makes mistakes in entering the password several times. The account lock differs from an invalid account in that, for example, a locked account returns to validity after a period of time or remain counted as users belonging to the tenant. The role is a user authority. For example, a role may be a tenant administrator or a general user. In the present embodiment, the tenant administrator and the general user are referred to as users. The application use permission indicates a list of applications that can be used by the user.

TABLE 3

| Item | Description |
| --- | --- |
| Tenant ID | ID of tenant who uses electronic device on which application operates |
| Device ID | Identification information that identifies electronic device |
| Display language | Default language displayed in menu, etc. |
| Account status | Valid, invalid, locked |
| Device type | MFP, electronic whiteboard, etc. |

TABLE 3-continued

| Item | Description |
| --- | --- |
| Application use permission | List of applications |

Table 3 schematically illustrates the device information stored in the device information storage unit 593. The device information is associated with the tenant ID and includes a device ID, the display language, the account status, and a device type. The tenant ID is the ID of the tenant who uses the electronic device 40 on which the application operates. The device ID is identification information that identifies the electronic device 40. The display language is the default language displayed in menus, etc. The account status indicates whether the account is valid, invalid, or locked. The device type is a type of electronic device 40 such as the MFP and the electronic whiteboard. The application use permission is a list of applications that can be used by the electronic device 40.

TABLE 4

| Item | Description |
| --- | --- |
| Tenant ID | ID of tenant who purchased license |
| License ID | Identification information of license |
| Application ID | ID of licensed application |
| License name | Name of purchased license |
| License type | User license or device license |
| Automatic assignment flag | Valid (automatically assigns application use permission) or invalid (does not automatically assign application use permission). |
| Number of licenses | 100 |

Table 4 schematically illustrates license information stored in the license information storage unit 594. The license information includes the tenant ID, a license ID, an application ID, a license name, a license type, an automatic assignment flag, and a number of licenses. The tenant ID is the identification information of the tenant who purchased the license. The license ID is license identification information. The application ID is the Identification information of the licensed application. The license name is the name of the purchased license. The license name may have a function of identifying a license. The license is associated with the application by the license name. The license type indicates whether the contract is for each user or for each electronic device. The license type may also indicate if the license is under a trial contract or under an official contract. The automatic assignment flag indicates whether the automatic assignment flag is valid (automatically assigns the application use permission) or invalid (does not automatically assigns the application use permission). The number of licenses indicates the number of users who can use the application, the number of electronic devices 40, or both.

TABLE 5

| Item | Description |
| --- | --- |
| Tenant ID | ID of tenant to who uses application |
| Application ID | ID of application |
| Role | Tenant administrator or general user |

Table 5 schematically illustrates the application information stored in the application information storage unit 595. The application information includes the application ID and the role corresponding to the tenant ID. The staff member registers the application information according to the contract status of the service. The application information may be automatically registered according to the contract of service. The tenant ID is the identification information of the tenant to whom the application was sold. The application ID is the identification information of the application. The role is the authority to use the application. For example, the role may be the tenant administrator or the general user.

Note that the tables are presented only for the purpose of describing the present embodiment, and information of less importance is omitted.

Figure 7:
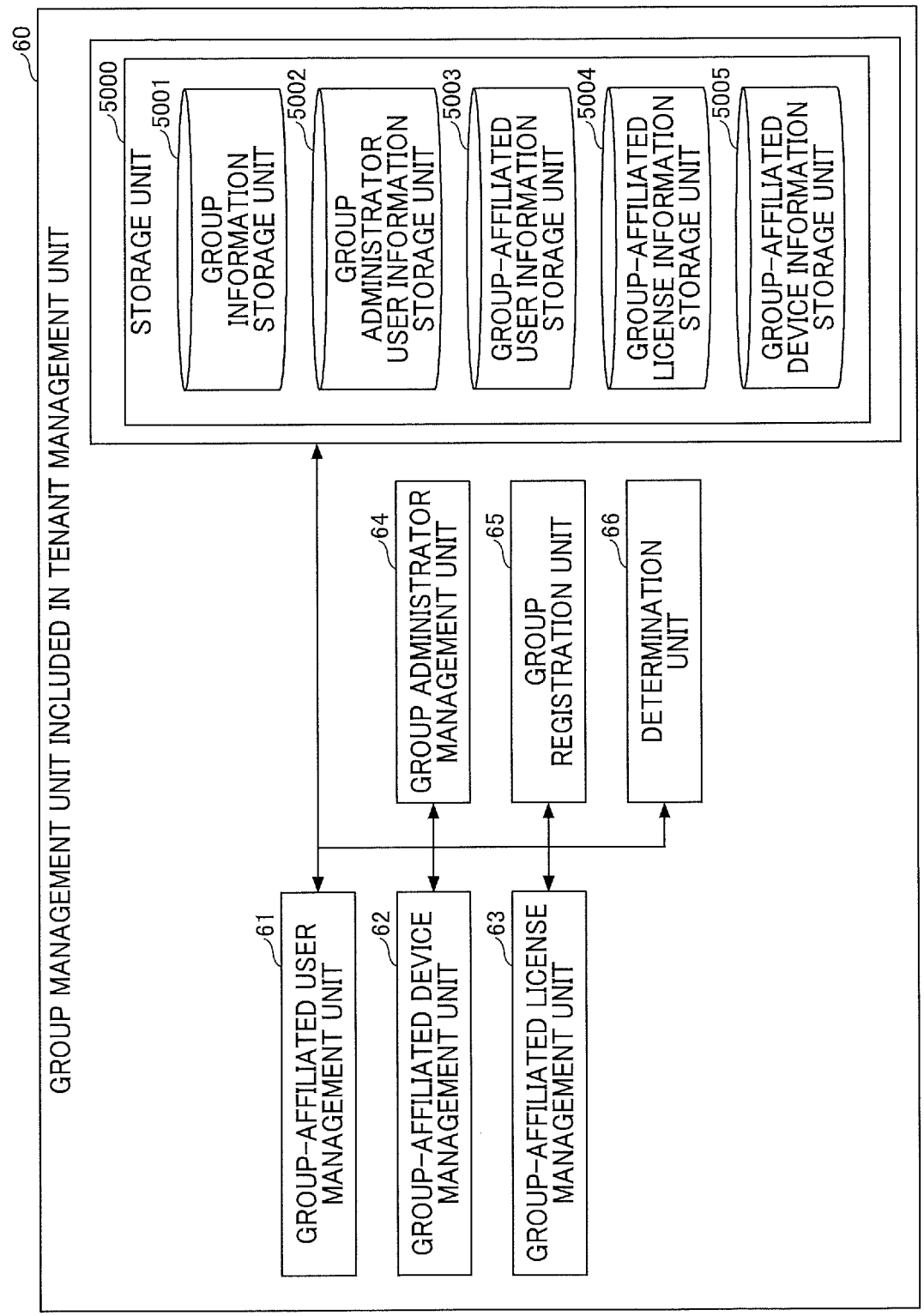
FIG. 7 is a block diagram illustrating functions of a group management unit.

The group management function is described with reference to FIG. 7. FIG. 7 is a block diagram illustrating functions of the group management unit 60. As illustrated in FIG. 6, the tenant management unit 53 includes the group management unit 60.

The group management unit 60 includes a group-affiliated user management unit 61, a group-affiliated device management unit 62, a group-affiliated license management unit 63, a group administrator management unit 64, a group registration unit 65, and a determination unit 66.

The group-affiliated user management unit 61 accepts registration of the user belonging to the group and stores user information in the group-affiliated user information storage unit 5003. In addition, the group-affiliated user management unit 61 acquires information on users belonging to the group from the group-affiliated user information storage unit 5003.

The group-affiliated device management unit 62 accepts registration of the electronic device 40 belonging to the group and stores device information in the group-affiliated device information storage unit 5005. In addition, the group-affiliated device management unit 62 acquires information on the electronic device 40 belonging to the group from the group-affiliated device information storage unit 5005.

The group-affiliated license management unit 63 accepts registration of the license belonging to the group and stores license information in the group-affiliated license information storage unit 5004. In addition, the group-affiliated license management unit 63 acquires information on the license belonging to the group from the group-affiliated license information storage unit 5004.

The group administrator management unit 64 accepts the registration of the group administrator and stores group administrator information in the group administrator user information storage unit 5002. In addition, the group administrator management unit 64 acquires the group administrator information from the group administrator user information storage unit 5002.

The group registration unit 65 accepts registration of the group and stores group information in the group information storage unit 5001. In addition, the group registration unit 65 acquires the group information from the group information storage unit 5001.

The determination unit 66 makes various determinations. For example, the determination unit 66 determines which group the user or the electronic device 40 belongs to.

Databases included in the storage unit 5000 managed by the group management system 203 is described.

TABLE 6

| Group ID | Group Name | Tenant ID |
|---|---|---|
| group0001 | ABC Department | tenant0001 |
| group0002 | DEF Department | tenant0001 |
| group0003 | GHI Department | tenant0002 |

Table 6 schematically illustrates a group table stored in the group information storage unit 5001. The group table includes a group ID, a group name, and a tenant ID. The group ID is group identification information. The group name is a name of the group such as a department or team name assigned by the tenant administrator. The tenant ID is identification information of the tenant in which the group is created.

TABLE 7

| Group administrator ID | Group ID | User ID of group administrator user |
|---|---|---|
| group_user 0001 | group0001 | user0002 |

Table 7 schematically illustrates a group administrator user table stored in the group administrator user information storage unit 5002. The group administrator user table includes a group administrator ID, a group ID, and a user ID of the group administrator user. The group administrator ID is identification information of the group administrator. The group ID is group identification information. The user ID of the group administrator user is identification information of the user registered as the group administrator.

TABLE 8

| Group-affiliated user ID | Group ID | User ID of user belonging to group |
|---|---|---|
| group_user0001 | group0001 | user0002 |

Table 8 schematically illustrates a group-affiliated user table stored in the group-affiliated user information storage unit 5003. The group-affiliated user table includes a group-affiliated user ID, a group ID, and a user ID of a user who belongs to the group. The group-affiliated user ID is user identification information in the group. The group ID is group identification information. The user ID of a user who belongs to a group is identification information of a user registered in the group.

TABLE 9

| Group-affiliated license ID | Group ID | License ID of license belonging to group |
|---|---|---|
| group_license0001 | group0001 | license0001 |

Table 9 schematically illustrates the group-affiliated license table stored in the group-affiliated license information storage unit 5004. The group-affiliated license table includes a group affiliated license ID, a group ID, and a license ID of a license belonging to the group. The group-affiliated license ID is license identification information within the group. The group ID is group identification information. The license ID of the license belonging to the group is Identification information of the license registered in the group.

TABLE 10

| Group-affiliated device ID | Group ID | Device ID of device belonging to group |
|---|---|---|
| group_device0001 | group0001 | device0001 |

Table 10 schematically illustrates a group-affiliated device table stored in the group-affiliated device information storage unit 5005. The group-affiliated device table includes a group-affiliated device ID, a group ID, and a device ID of the electronic device 40 belonging to the group. The group-affiliated device ID is identification information of the electronic device 40 in the group. The group ID is group identification information. The group-affiliated device ID of the electronic device 40 is identification information of the electronic device 40 registered in the group.

In the following, group creation, group administrator designation, group-affiliated user designation, group-affiliated device designation, group-affiliated license designation, license-based use permission assignment, assignment restriction, and the like are described in order.

Figure 8:
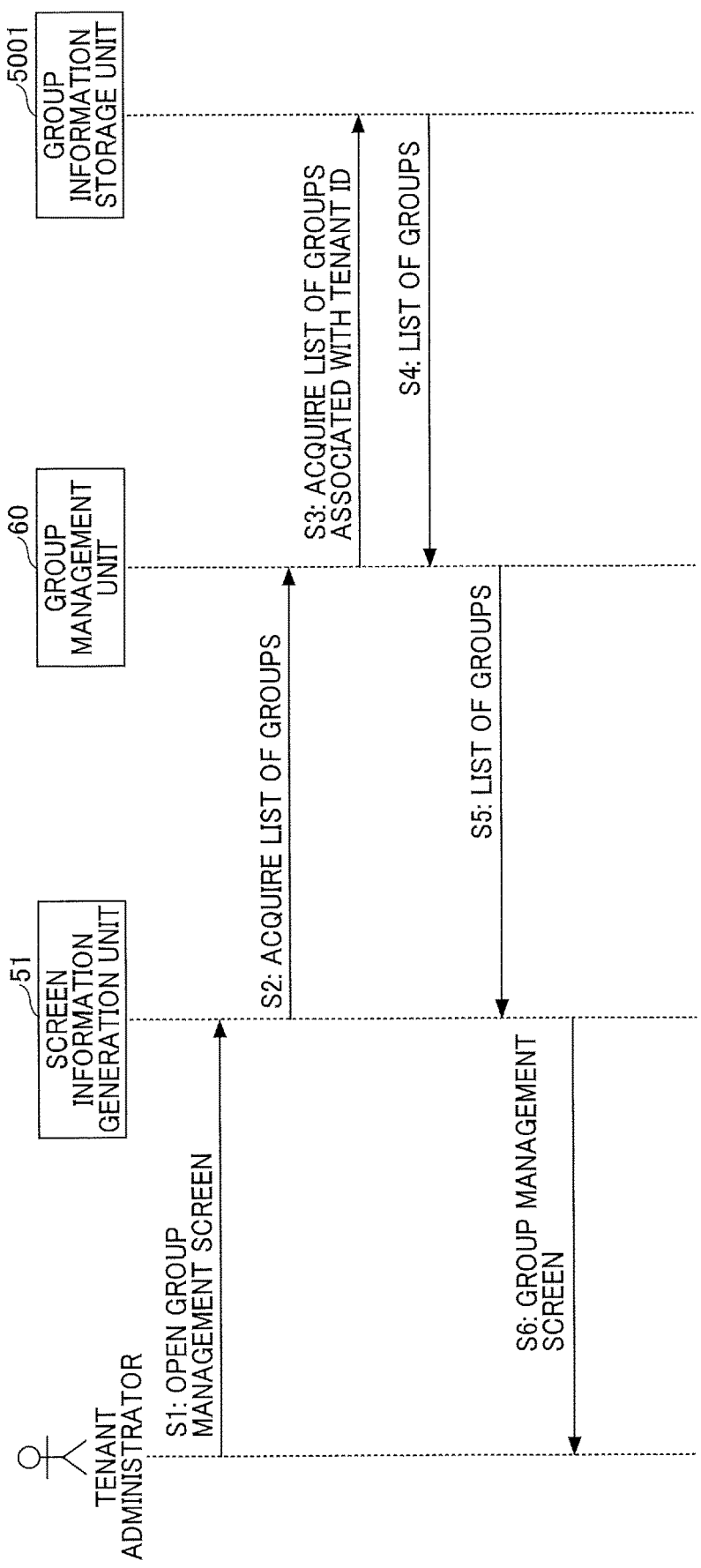
FIG. 8 is a sequence diagram illustrating a process executed by the first terminal device to displays a group management screen.

FIG. 8 is a sequence diagram illustrating a process executed by the first terminal device 10 to displays a group management screen.

Figure 9:
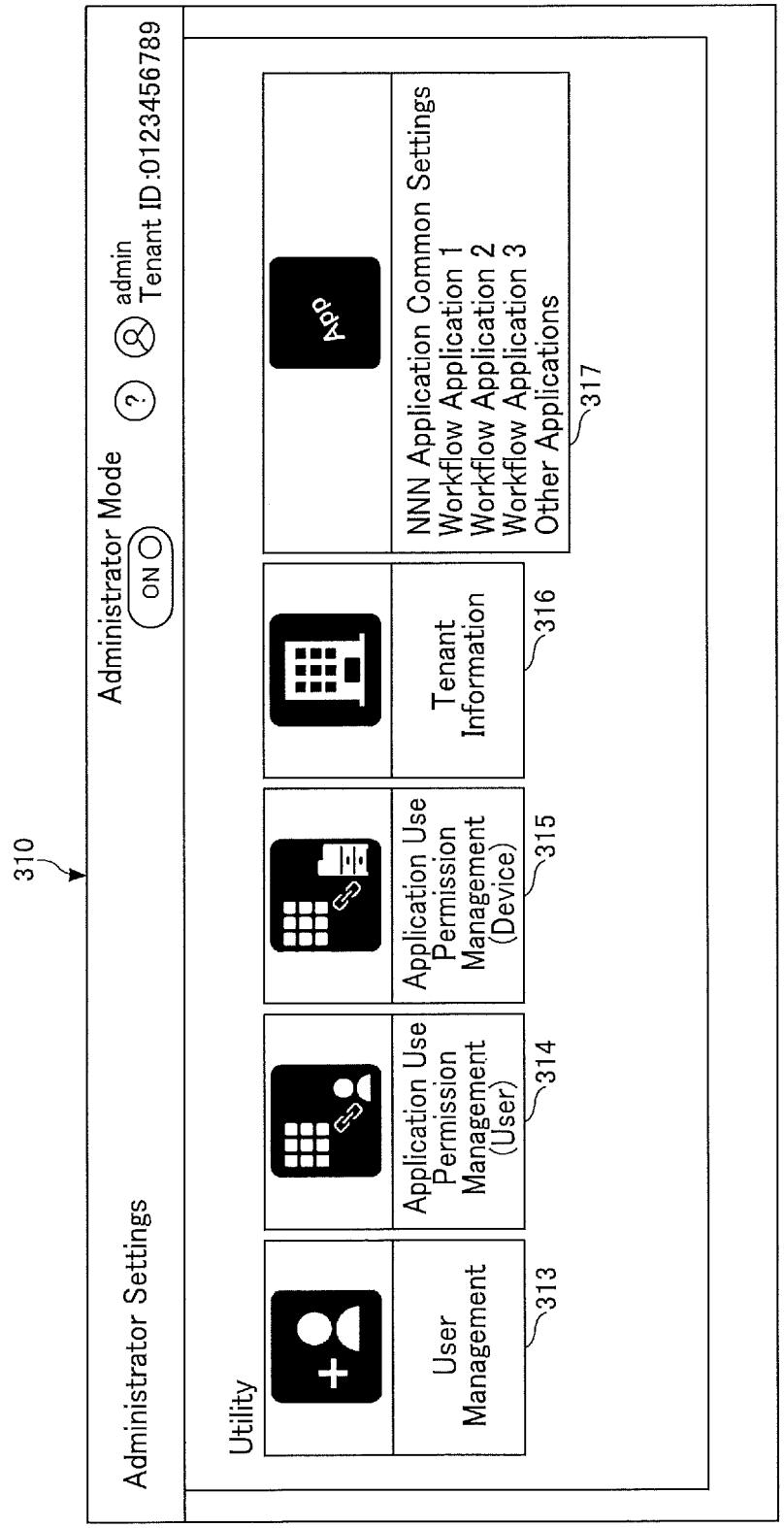

In step S1, the tenant administrator operates the first terminal device 10 to log in to the information processing system 50. When the tenant ID and administrator authority are confirmed by logging in, the screen information generation unit 51 transmits a home screen of the administrator to the first terminal device 10. The tenant administrator operates to open the group management screen on the home screen. The operation reception unit 14 of the first terminal device 10 accepts the operation. An example of the home screen is illustrated in FIG. 9.

In step S2, a request for the group management screen is transmitted to the screen information generation unit 51 of the information processing system 50. The screen information generation unit 51 designates the tenant ID and transmits a request for a list of groups to the tenant management unit 53.

In step S3, the group registration unit 65 of the tenant management unit 53 acquires a list of groups to which the tenant ID is associated from the group information storage unit 5001.

In steps S4 and S5, the list of groups is transmitted to the screen information generation unit 51.

In step S6, the screen information generation unit 51 generates screen information of the group management screen using the list of groups. The screen information generation unit 51 transmits the screen information of the group management screen to the first terminal device 10 through the fifth communication unit 52. The first communication unit 12 of the first terminal device 10 receives the screen information of the group management screen and the display control unit 13 displays the group management screen. An example of the group management screen is illustrated in FIG. 10.

FIG. 9 is an example of the home screen 310 displayed by the first terminal device 10 after the tenant administrator logs in. When the authentication is successful in response to the login request, the first terminal device 10 displays the home screen 310. On the home screen 310, a user management button 313, an application use permission management (user) button 314, an application use permission management (device) button 315, a tenant information button 316, and an application common settings button 317 are displayed. The user management button 313 is a button for displaying a user management screen for the tenant administrator to manage the user. The application use permission management (user) button 314 is a button for displaying a screen to manage which user can use which application. The application use permission management (device) button 315 is a button for displaying a screen to manage which electronic device 40 can use the application. The tenant information button 316 is a button for displaying a screen for displaying the contract details and the like of the tenant. The application common settings button 317 is a button for displaying a screen to set common settings for each application.

Figure 10:
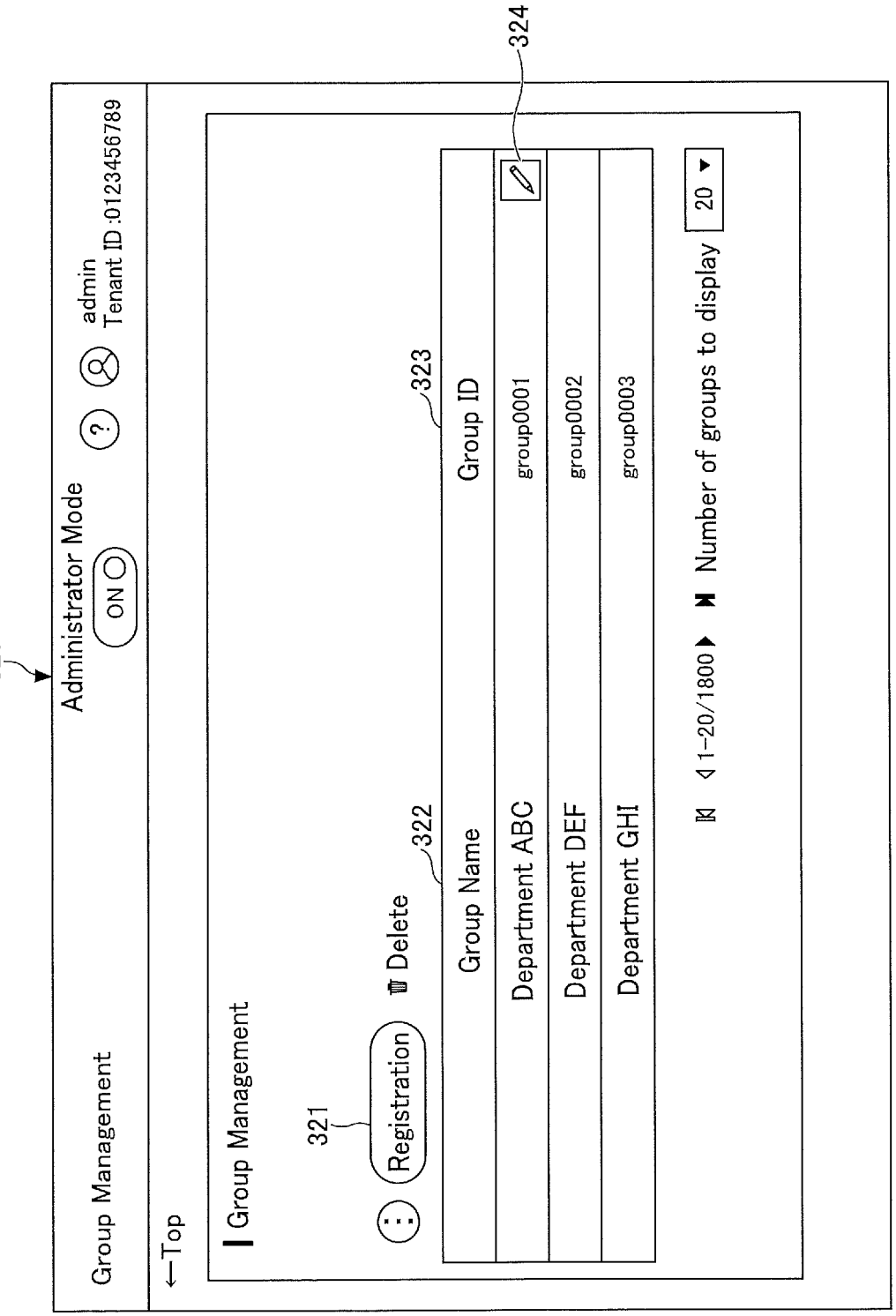
FIG. 10 is a diagram illustrating an example of a group management screen.

FIG. 10 is an example of the group management screen 320. The group management screen 320 is a screen for displaying the list of groups. The group management screen 320 includes a group name field 322 and a group ID field 323 displayed in association with each other. In addition, an edit button 324 is displayed for each group according to a user operation such as mouse over. The edit button 324 is a button for displaying a screen to accept editing of a registered group. Further, the group management screen 320 includes a registration button 321 and a new group can be created and registered by pressing the registration button 321.

The creation of the group is described with reference to FIGS. 11 to 13.

Figure 11:
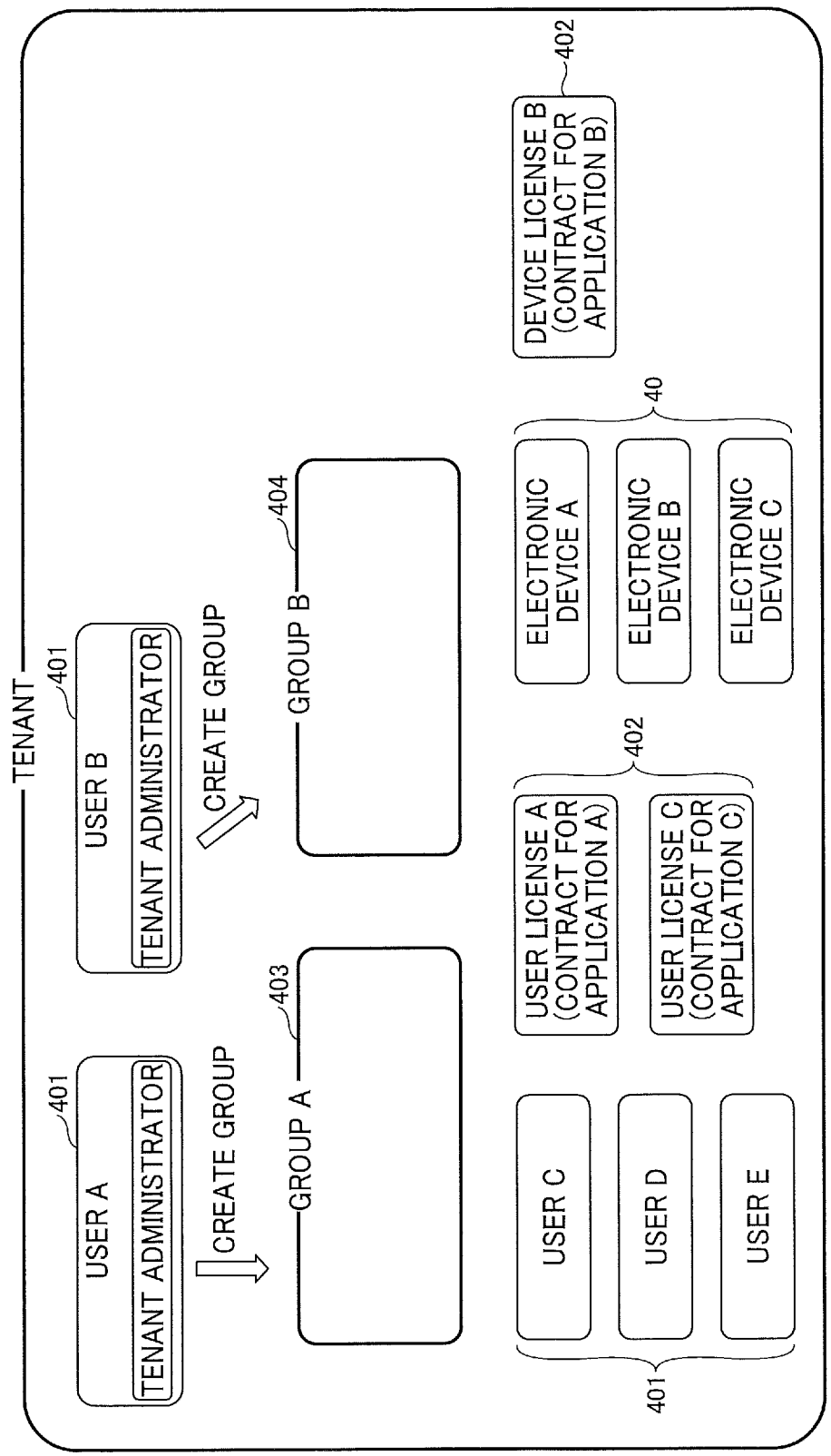
FIG. 11 is a schematic diagram illustrating creation of groups.

FIG. 11 is a diagram schematically illustrating group creation. Users A to E, electronic devices A to C, and licenses A to C belong to the tenant of FIG. 11. The tenant administrator can create, for example, a group A 403 and a group B 404 in the tenant. In addition, the tenant administrator can register users in the created groups A and B.

Figure 12:
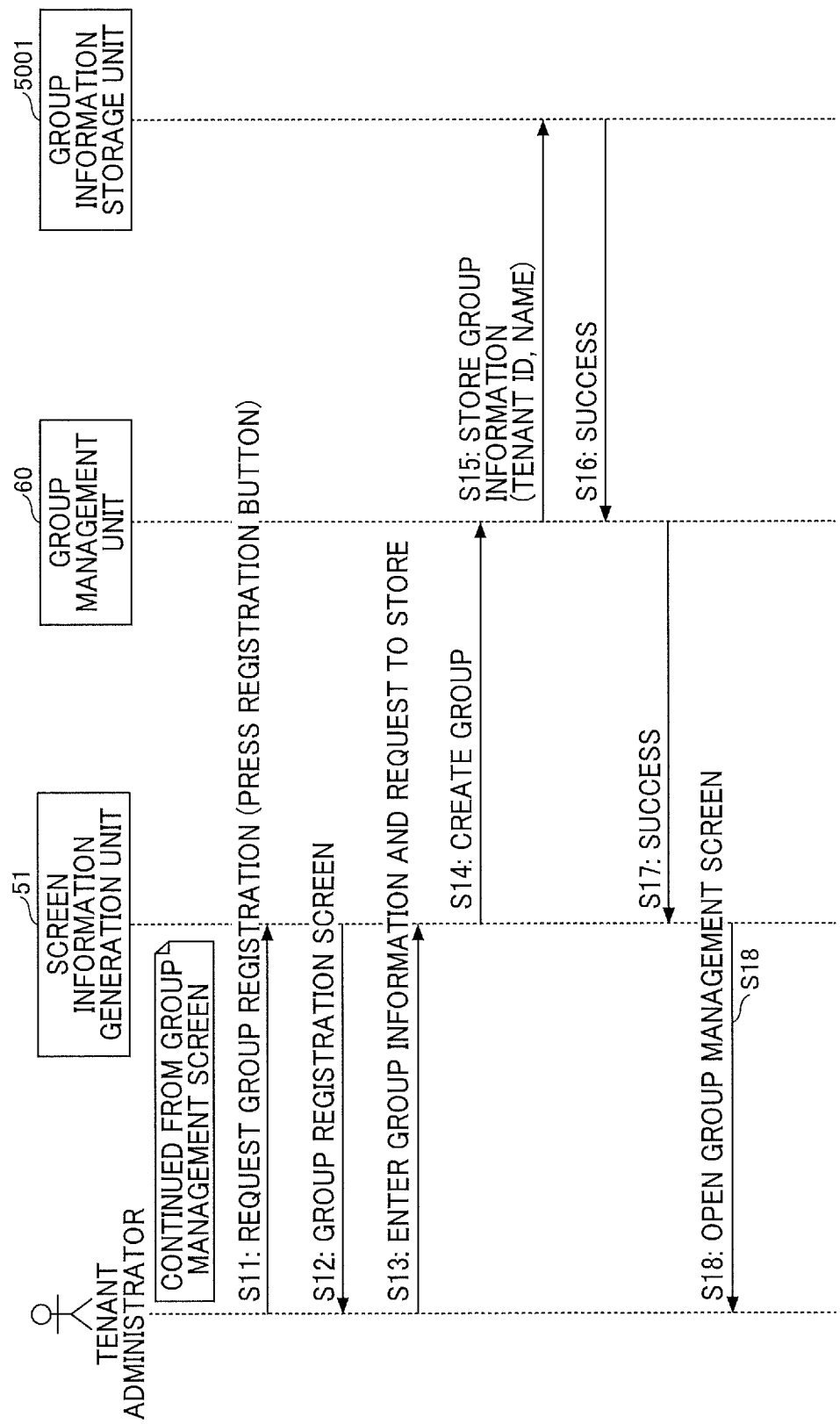
FIG. 12 is a sequence diagram illustrating a process initiated by a tenant administrator to create a group.

FIG. 12 is a sequence diagram illustrating a process initiated by a tenant administrator to create a group.

In step S11, the tenant administrator presses the registration button 321 on the group management screen 320 in order to newly register the group. The operation reception unit 14 of the first terminal device 10 accepts the pressing of the registration button 321.

In step S12, pressing of the registration button 321 is transmitted to the information processing system 50, and the screen information generation unit 51 transmits the screen information of a group creation screen to the first terminal device 10 through the fifth communication unit 52.

In step S13, the first communication unit 12 of the first terminal device 10 receives the screen information of the group creation screen and the display control unit 13 displays the group creation screen. An example of the group creation screen is illustrated in FIG. 13. The tenant administrator inputs the group information on the group creation screen and presses an OK button 333 (save request button). The operation reception unit 14 of the first terminal device 10 accepts the input of group information. The group information is transmitted to the information processing system 50.

In step S14, the fifth communication unit 52 of the information processing system 50 receives the group information, and the screen information generation unit 51 requests the group management unit 60 to create a group.

In step S15, the group registration unit 65 of the group management unit 60 stores the group information (tenant ID, group name) in the group information storage unit 5001. Also, a non-overlapping group ID is assigned.

In steps S16 and S17, the success of group creation is transmitted to the screen information generation unit 51.

In step S18, the screen information generation unit 51 generates the screen information of the group management screen 320 by using the list of groups. The first communication unit 12 of the first terminal device 10 receives the screen information of the group management screen 320, and the display control unit 13 displays the group management screen 320. The registered group is added to the group management screen 320.

Figure 13:
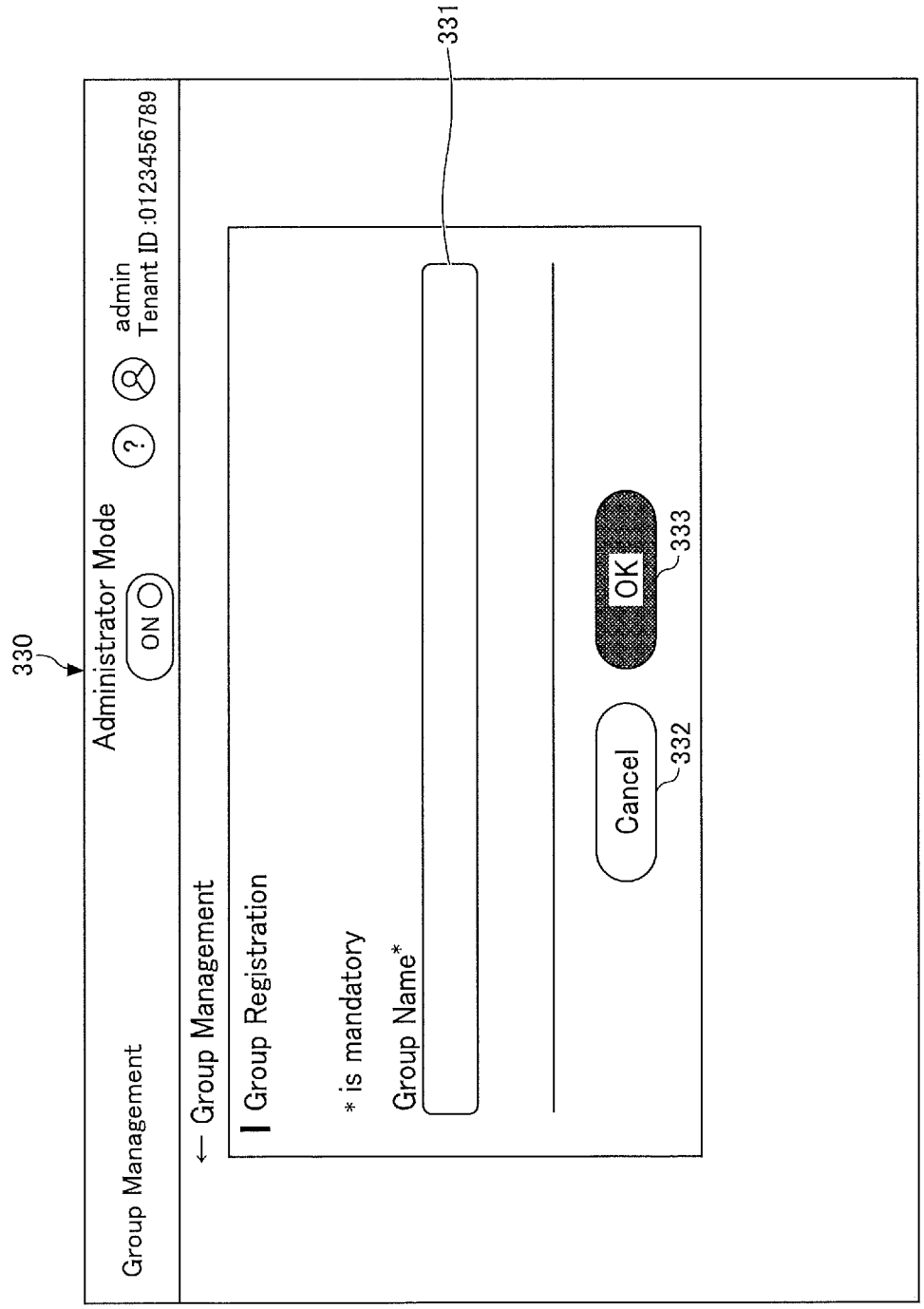
FIG. 13 is a diagram illustrating an example of a group creation screen displayed by the first terminal device.

FIG. 13 is an example of a group creation screen 330 displayed by the first terminal device 10. The group creation screen 330 includes a group name field 331, a cancel button 332, and the OK button 333. The tenant administrator inputs a group name in the group name field 331 and presses the OK button 333.

When the group is created, the tenant administrator can designate the users and group administrators who belong to the group.

Figure 14:
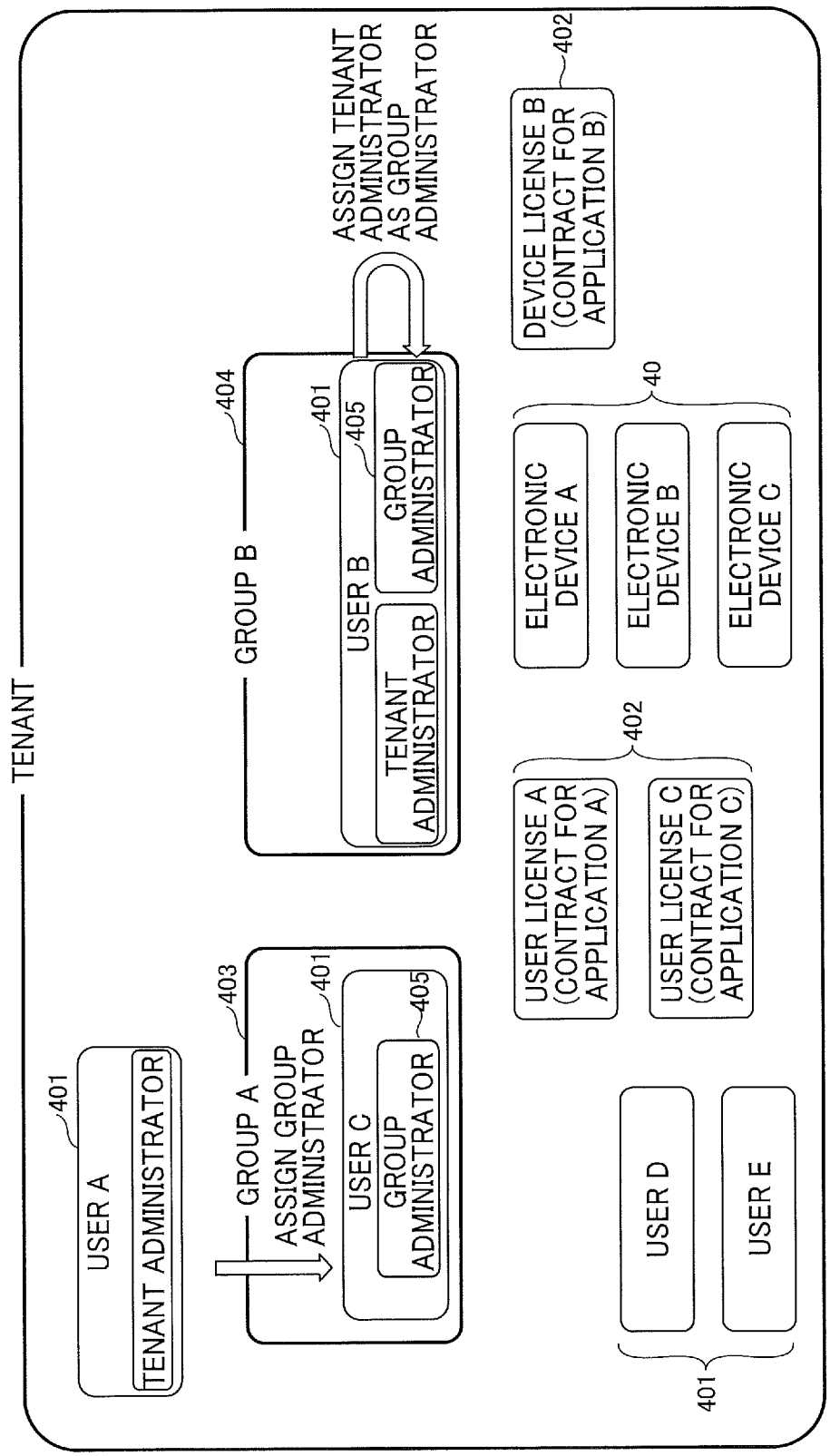
FIG. 14 is a schematic diagram illustrating designation of a group administrator.

FIG. 14 is a diagram schematically illustrating the designation of the group administrator. In the description of FIG. 14, difference from FIG. 11 is mainly described. In FIG. 14, the groups A and B are created. The tenant administrator (user A) designates user C as the group administrator 405 of group A. The tenant administrator (user B) designates the user B as the group administrator 405 of the group B. In other words, the tenant administrator designates himself as the group administrator of group B.

Figure 15:
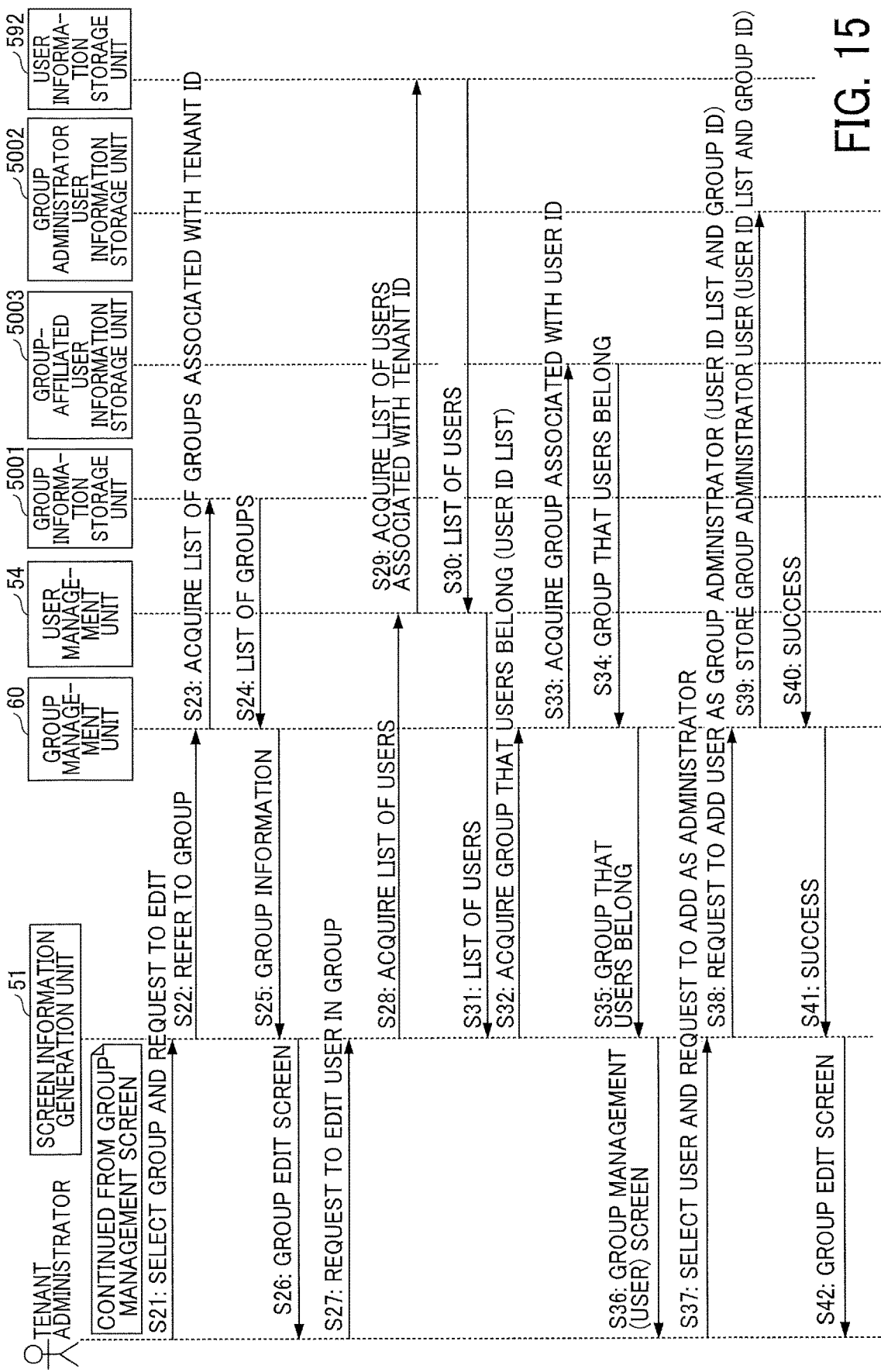
FIG. 15 is a sequence diagram illustrating a process initiated by the tenant administrator to designate the group administrator.

FIG. 15 is a sequence diagram illustrating a process initiated by the tenant administrator to designate the group administrator. As described below, the group administrator is selected from the tenant users. Selecting the group administrator is a process similar to registering users in the group. For convenience of explanation, the users are already registered in the group.

In step S21, the tenant administrator presses the edit button 324 on the group management screen 320. The operation reception unit 14 of the first terminal device 10 accepts the pressing of the edit button 324.

In step S22, pressing of the edit button 324 is transmitted to the information processing system 50, and the screen information generation unit 51 requests the group management unit 60 to refer to the group.

In steps S23 and S24 the group registration unit 65 designates a tenant ID and acquires a list of groups having the same tenant ID as the tenant administrator from the group information storage unit 5001. More specifically, the group registration unit 65 acquires the user information, the device information, and the license information corresponding to the group ID selected by the tenant administrator.

In step S25, the group registration unit 65 transmits the list of groups to the screen information generation unit 51.

In step S26, the screen information generation unit 51 transmits screen information of a group edit screen to the first terminal device 10 through the fifth communication unit 52.

Figure 16:
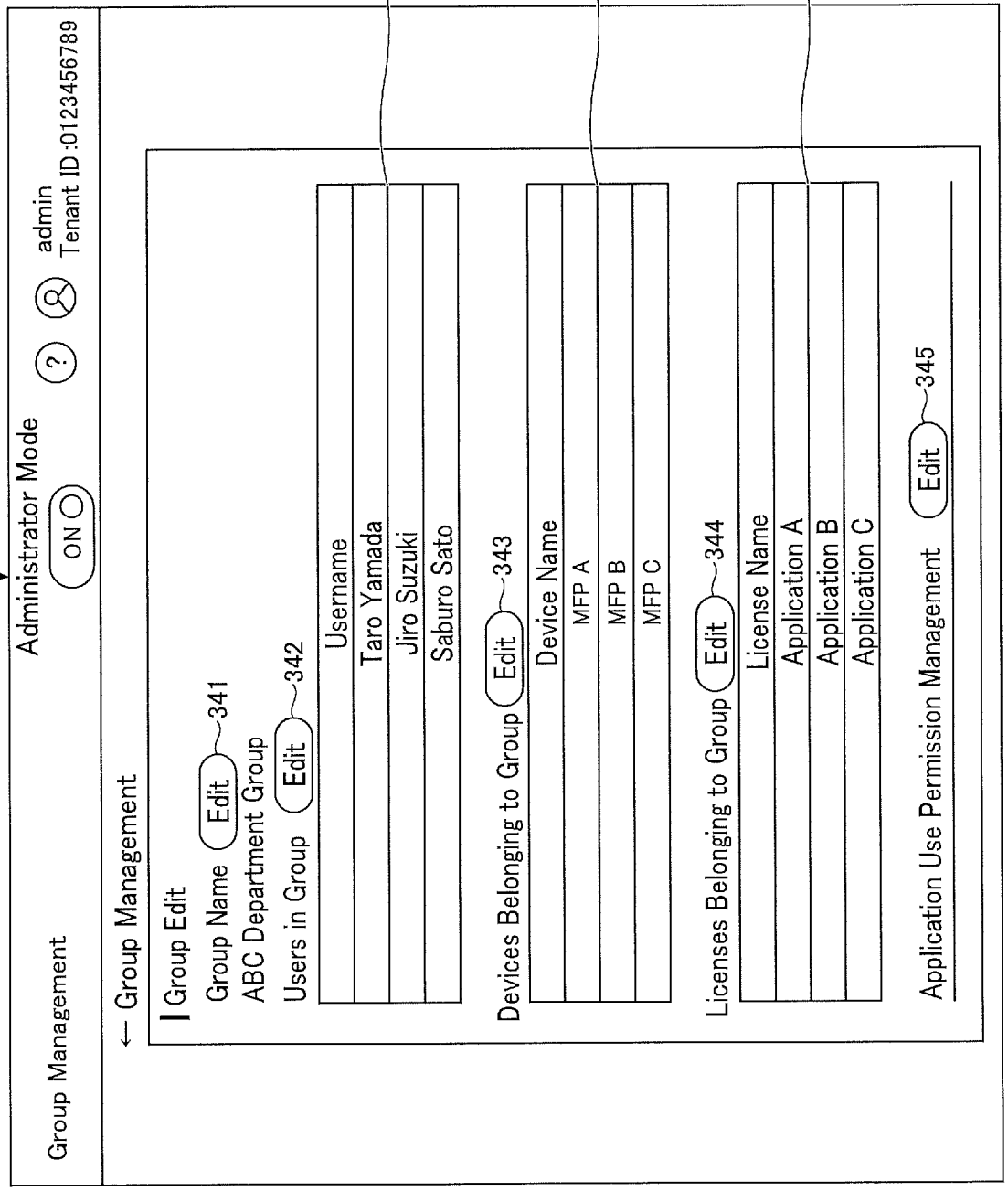
FIG. 16 is a diagram illustrating an example of a group edit screen displayed by the first terminal device.

In step S27, the first communication unit 12 of the first terminal device 10 receives the screen information of the group edit screen and the display control unit 13 displays the group edit screen. An example of the group edit screen is illustrated in FIG. 16. The tenant administrator performs user editing operation on the group edit screen. The operation reception unit 14 of the first terminal device 10 accepts the operation. The operation content is transmitted to the information processing system 50.

In step S28, the fifth communication unit 52 of the information processing system 50 receives a request for user editing, and the screen information generation unit 51 requests the list of users from the user management unit 54.

In steps S29 and S30, the user management unit 54 acquires the list of users having the same tenant ID as the tenant administrator from the user information storage unit 592.

In step S31, the user management unit 54 transmits the list of users to the screen information generation unit 51.

In step S32, the screen information generation unit 51 designates the user ID on the list of users and requests the group to which the user belongs from the group management unit 60.

In steps S33 and S34, the group-affiliated user management unit 61 of the group management unit 60 acquires the group ID corresponding to the user ID from the group-affiliated user information storage unit 5003.

In step S34 the group administrator management unit 64 transmits the group to which the users belong to the screen information generation unit 51.

In step S35, the screen information generation unit 51 generates screen information of the group management (user) screen by using the list of users and the group to which the users belong. On the group management (user) screen, when a user belongs to a group (selected by the tenant administrator), the user is checked. The screen information generation unit 51 transmits the screen information of the group management (user) screen to the first terminal device 10 through the fifth communication unit 52.

In step S36, the first communication unit 12 of the first terminal device 10 receives the screen information of the group management (user) screen and the display control unit 13 displays the group management (user) screen. An example of the group management (user) screen is illustrated in FIG. 17

In step S37, the tenant administrator selects a user to become the group administrator on the group management (user) screen and performs an operation to add the group administrator. The operation reception unit 14 of the first terminal device 10 accepts the operation. The user ID designated as the group administrator is transmitted to the information processing system 50.

In step S38, the fifth communication unit 52 of the information processing system 50 receives a request to add the group administrator, and the screen information generation unit 51 requests the group management unit 60 to add the group administrator. A list of user IDs to become group administrators and the group ID of the group administrator registration destination are transmitted.

In steps S39 and S40, the group administrator management unit 64 of the group management unit 60 stores the user ID and the group ID in association with each other in the group administrator user information storage unit 5002. Also, the group administrator ID is numbered and stored.

In step S41, a storage success is transmitted to the screen information generation unit 51.

In step S42, the screen information generation unit 51 generates a group edit screen and transmits the group edit screen to the first terminal device 10 through the fifth communication unit 52.

FIG. 16 is an example of the group edit screen 340 displayed by the first terminal device 10. The group edit screen 340 includes a group name edit button 341, a user edit button 342, a device edit button 343, a license edit button 344, and an application use permission management button 345. The group name edit button 341 is a button for the tenant administrator to edit the current group name. The user edit button 342 is a button for editing the user belonging to the group selected by the tenant administrator. The device edit button 343 is a button for editing the electronic device 40 belonging to the group selected by the tenant administrator. The license edit button 344 is a button for editing the license belonging to the group selected by the tenant administrator. The application use permission management button 345 is a button for managing application use permission on a group basis.

In FIG. 16, users, devices, and licenses are displayed in the user list column 346, the device list column 347, and the license list column 348, respectively, but nothing is displayed immediately after the group is created.

FIG. 17 is an example of the group management (user) screen 350 displayed by the first terminal device 10. The group management (user) screen 350 is a screen for the tenant administrator to register a user in the group and to designate the group administrator. Both user registration and group administrator designation are performed on the group management (user) screen 350.

The group management (user) screen 350 is a two-dimensional table in which a general column 352 and an administrator column 353 are displayed in association with a user column 351. A list of users belonging to the tenant is displayed in the user column 351. Each of the general column 352 and the administrator column 353 includes a check box 354 respectively. When the check box 354 in the general column is checked, the user belongs to the group. When the check box 354 in the administrator column 353 is checked, the user is designated as a group administrator. The user designated as the administrator is also a user of the group.

The user who has horizontal line 355 displayed on the group management (user) screen 350 is a user who already belongs to another group. Horizontal line 355 does not accept selection. Therefore, this user cannot belong to any other group. However, it may be possible for one user to belong to a plurality of groups.

FIG. 18 is a group administrator designation (plural groups) screen 360, which is a modification of the group management (user) screen 350. In the group management (user) screen 350 of FIG. 17, user registration and administrator designation are made for one group selected by the tenant administrator. On the other hand, on the group administrator designation (plural groups) screen 360 of FIG. 18, user registration and administrator designation are possible for all groups in the tenant.

The group administrator designation (plural groups) screen 360 is a two-dimensional table in which each group 362 is displayed together with the user column 361. Check boxes 363 for general users and administrators are displayed for each group. The tenant administrator can register the user and designate the administrator as in FIG. 17. The function of the horizontal line 364 may be the same as that of the group management (user) screen 350.

The registration of user belonging to the group is described. As described above, the registration of user to a group is performed on the same screen as the designation of group administrator. Therefore, overall process is the same.

Figure 19:
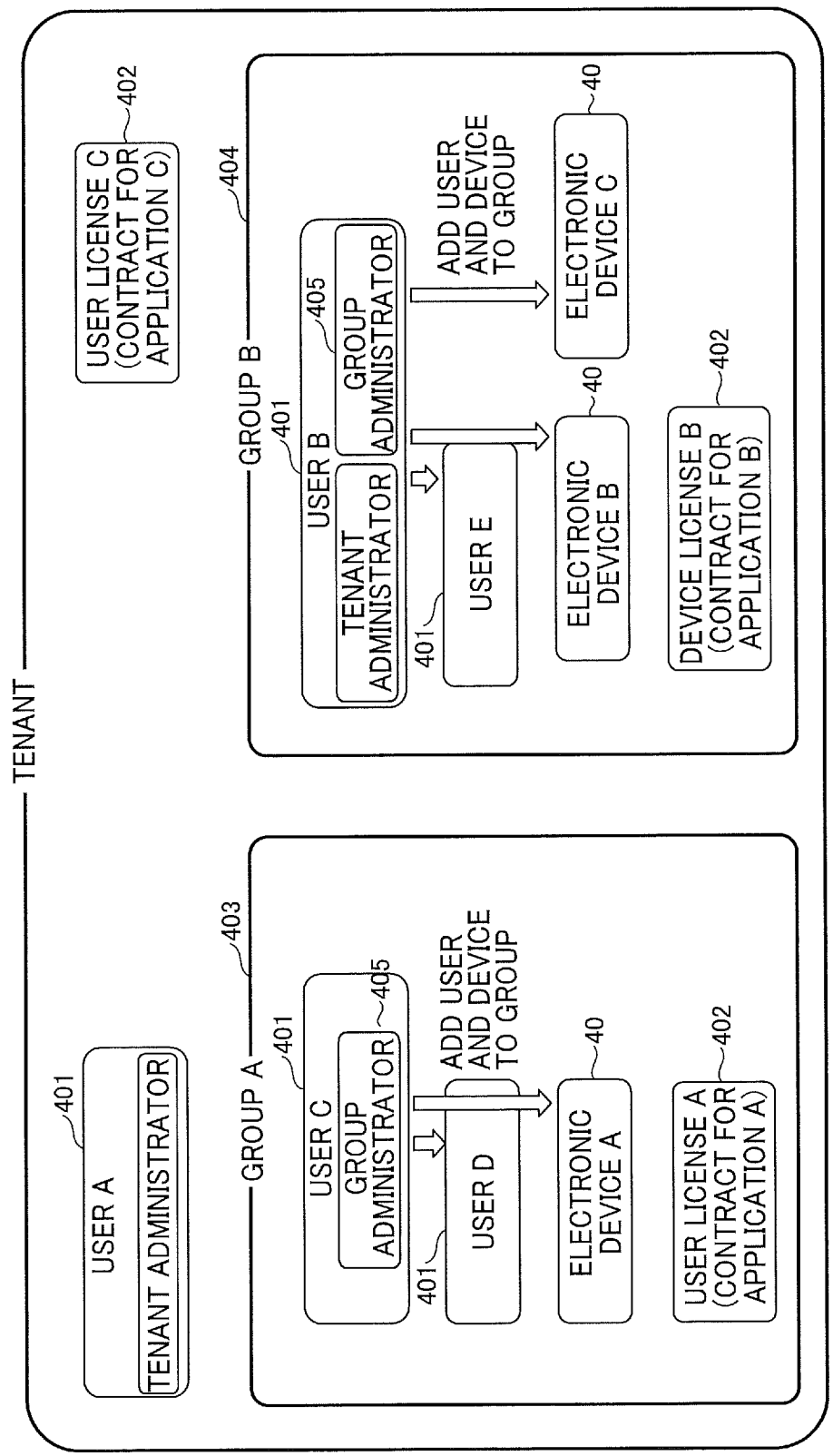
FIG. 19 is a schematic diagram illustrating registration of a user in the group.

FIG. 19 is a diagram schematically illustrating the registration of user to the group.

Groups A and B have been created for this tenant. The tenant administrators are user A and user B, the group administrator of group A is user C, and the group administrator of group B is user B.

The user, the electronic device 40, and the license can be registered in the group by the tenant administrator or the group administrator. Therefore, for example, user C can register user D, electronic device A, and license A in group A. User B can register user E, electronic devices B and C, and license B in group B.

As a result, users C and D, electronic device A, and license A belong to group A.

Users B and E, electronic devices B and C, and license B belong to group B. User A and license C do not belong to the groups.

Figure 20:
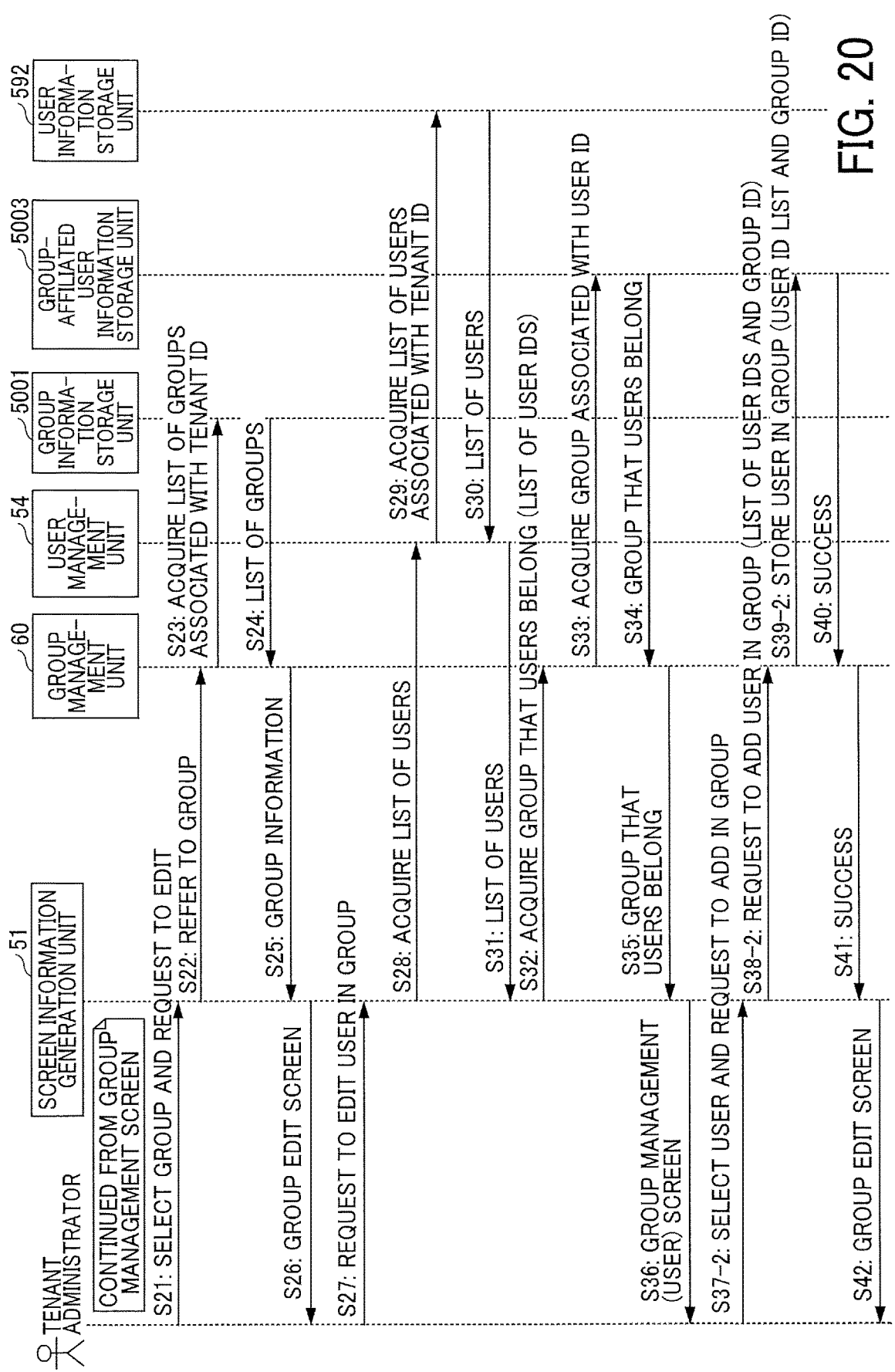
FIG. 20 is a sequence diagram illustrating a process initiated by the tenant administrator or the group administrator to register a user in the group.

FIG. 20 is a sequence diagram illustrating a process initiated by the tenant administrator or the group administrator to register a user in the group. In the description of FIG. 20, difference from FIG. 15 is mainly described. The processing of steps S21 to S36 may be the same as in FIG. 15.

In step S37-2, the tenant administrator or group administrator selects a user who is to be registered in the group on the group management (user) screen 350 and performs a registration operation. The operation reception unit 14 of the first terminal device 10 accepts the operation. The user ID and the registration destination group ID are transmitted to the information processing system 50.

In step S38-2, the fifth communication unit 52 of the information processing system 50 receives the user registration request and the screen information generation unit 51 requests the group management unit 60 to register the user in the group. A list of user IDs registered in the group and the group ID of the registration destination are transmitted.

In step S39-2, the group-affiliated user management unit 61 of the group management unit 60 stores the user ID and the group ID in the group-affiliated user information storage unit 5003 in association with each other. Also, a group affiliated user ID is numbered and stored.

Subsequent processing may be the same as in FIG. 15.

Figure 21:
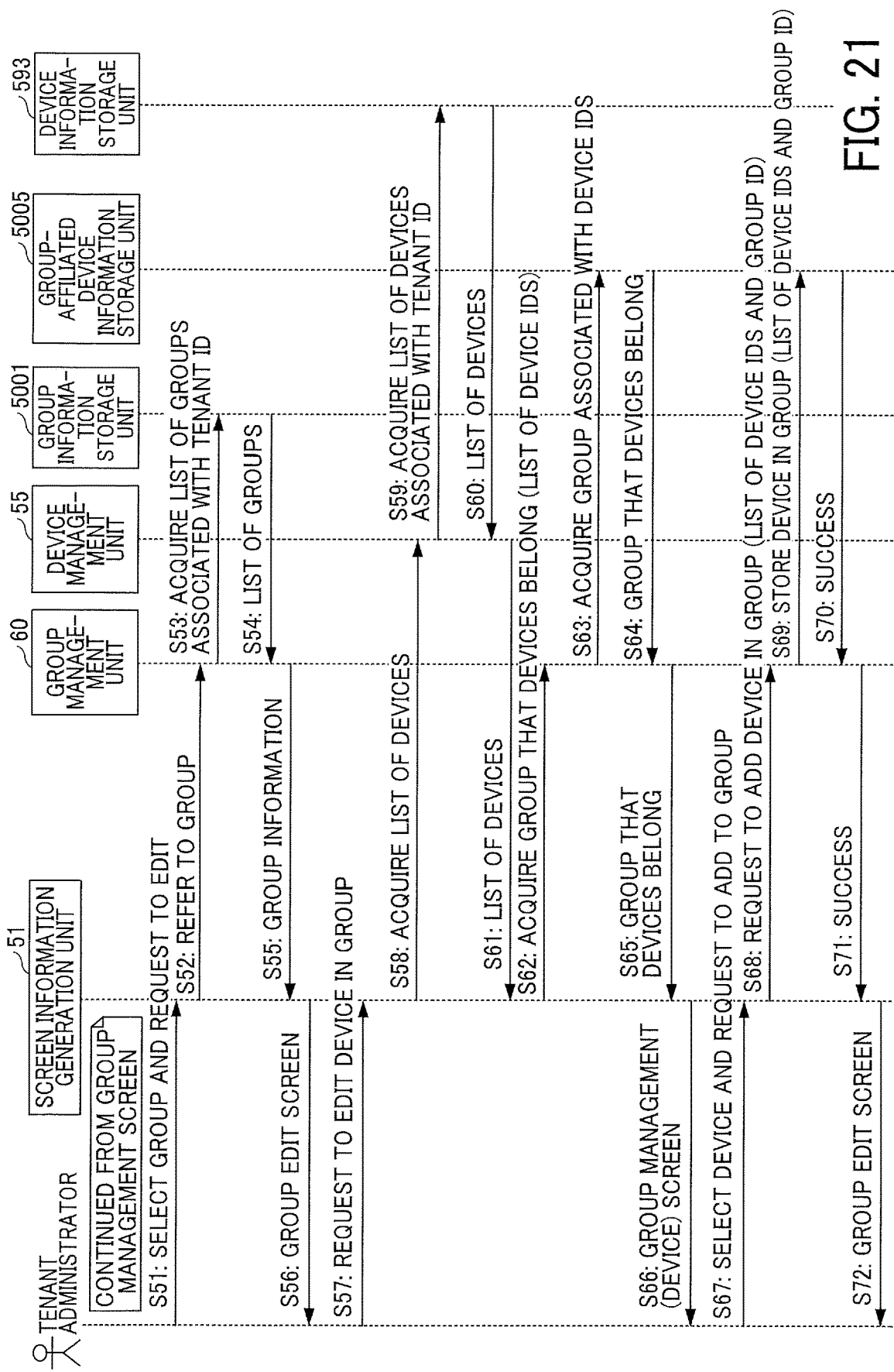
FIG. 21 is a sequence diagram illustrating a process initiated by the tenant administrator or the group administrator to register the electronic device in the group.

A registration of the electronic device 40 in the group is described with reference to FIGS. 21 to 23. FIG. 21 is an example of a sequence diagram in which the tenant administrator or the group administrator registers the electronic device 40 in the group.

The process up to displaying the group edit screen in steps S51 to S56 may be the same as in steps S21 to S26 of FIG. 15.

In step S57, the first communication unit 12 of the first terminal device 10 receives the screen information of the group edit screen and the display control unit 13 displays the group edit screen 340. An example of the group edit screen 340 is illustrated in FIG. 16. The tenant administrator or group administrator performs a device edit operation on the group edit screen 340 (presses the device edit button 343). The operation reception unit 14 of the first terminal device 10 accepts the operation. The operation content is transmitted to the information processing system 50.

In step S58, the fifth communication unit 52 of the information processing system 50 receives the device edit request and the screen information generation unit 51 requests a list of devices from the device management unit 55.

In steps S59 and S60, the device management unit 55 acquires the list of devices having the same tenant ID as the tenant administrator or group administrator from the device information storage unit 593.

In step S61, the device management unit 55 transmits the list of devices to the screen information generation unit 51.

In step S62, the screen information generation unit 51 designates the device ID on the list of devices and requests the group to which the electronic device 40 belongs from the group management unit 60.

In steps S63 and S64, the group-affiliated device management unit 62 of the group management unit 60 acquires the group ID corresponding to the device ID from the group-affiliated device information storage unit 5005.

In step S64, the group-affiliated device management unit 62 transmits the group to which the device belongs to the screen information generation unit 51.

In step S65, the screen information generation unit 51 generates screen information on the group management (device) screen by using the list of devices and the group to which the electronic device 40 belongs. On the group management (device) screen, if the electronic device 40 belongs to a group (selected by the tenant administrator), a check mark is added to the electronic device 40. The screen information generation unit 51 transmits the screen information of the group management (device) screen to the first terminal device 10 through the fifth communication unit 52.

In step S66, the first communication unit 12 of the first terminal device 10 receives the screen information of the group management (device) screen and the display control unit 13 displays the group management (device) screen. FIG. 22 illustrates an example of the group management (device) screen.

In step S67, the tenant administrator selects the electronic device 40 to be registered in the group on the group management (device) screen and performs a registration operation. The operation reception unit 14 of the first terminal device 10 accepts the operation. The device ID of the electronic device 40 to be registered in the group and the group ID of the registration destination are transmitted to the information processing system 50.

In step S68, the fifth communication unit 52 of the information processing system 50 receives the registration request of the electronic device 40 and the screen information generation unit 51 requests the group management unit 60 to register the electronic device 40 in the group. A list of device IDs of the electronic devices 40 to be registered in the group and a group ID of the registration destination are transmitted.

In steps S69 and S70, the group-affiliated device management unit 62 of the group management unit 60 stores the device ID and the group ID in the group-affiliated device information storage unit 5005 in association with each other. Also, a group affiliated device ID is numbered and stored.

In step S71, the storage success is transmitted to the screen information generation unit 51.

In step S72, the screen information generation unit 51 generates the group edit screen and transmits the group edit screen to the first terminal device 10 through the fifth communication unit 52.

FIG. 22 is an example of the group management (device) screen 370 displayed by the first terminal device 10. The group management (device) screen 370 is a screen for the tenant administrator to register the electronic device 40 in the group.

The group management (device) screen 370 is a two-dimensional table in which a group name column 372 is displayed in association with a device name column 371. A list of electronic devices 40 belonging to the tenant is displayed in the device name column 371. The group name column 372 includes check boxes 373. When a check box 373 is checked, the electronic device 40 corresponding to the check box belongs to the group.

The electronic device 40 on which the horizontal line 374 is displayed on the group management (device) screen 370 is an electronic device 40 that already belongs to another group. Therefore, the electronic device 40 cannot belong to another group. However, it may be made possible for one electronic device 40 to belong to a plurality of groups.

FIG. 23 is a modification of the group management (device) screen 370, which is a group-affiliated device (plural groups) screen 380. In the group management (device) screen 370 of FIG. 22, devices are registered for one group selected by the tenant administrator. On the other hand, on the group-affiliated device (plural groups) screen 380 of FIG. 23, device registration is possible for all groups in the tenant.

On the group-affiliated device (plural groups) screen 380, each group 382 is displayed together with a device column 381. Check boxes 383 are displayed for each group. The tenant administrator or group administrator can check the check box 383 to register the device. The function of the horizontal line 384 may be the same as the group management (device) screen 370.

Figure 24:
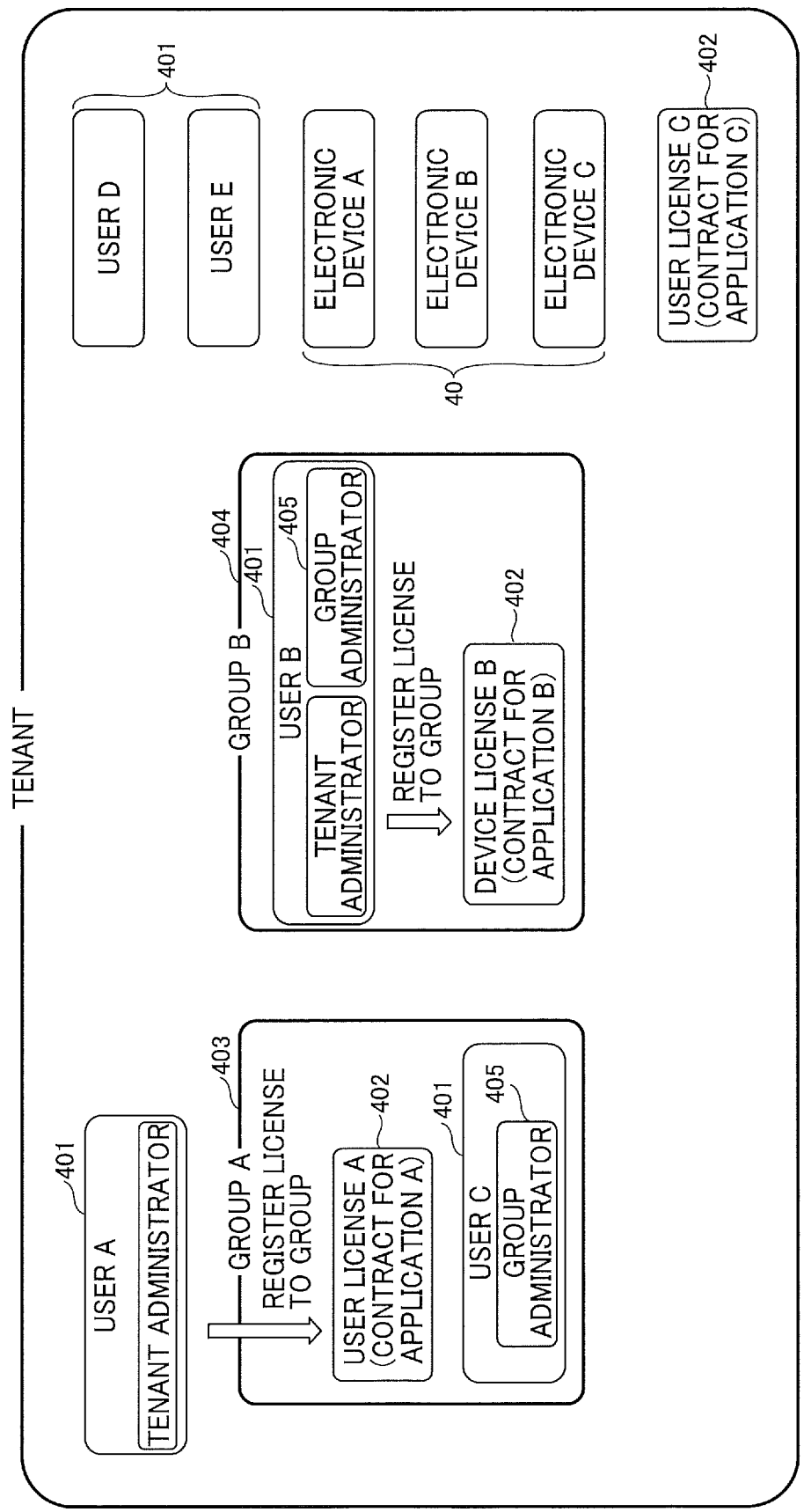
FIG. 24 is a schematic diagram illustrating registration of a license in the group.

The registration of license belonging to the group is described with reference to FIGS. 24 to 27. FIG. 24 is a diagram schematically illustrating license registration to the group. Groups A and B have been created for the tenant in FIGS. 24 to 27. The tenant administrators are user A and user B, the group administrator of group A is user C, and the group administrator of group B is user B.

For example, user A, who is the tenant administrator, can register license A in the group A. User B, who is both the tenant administrator and the group administrator, can register license B in the group B.

Figure 25:
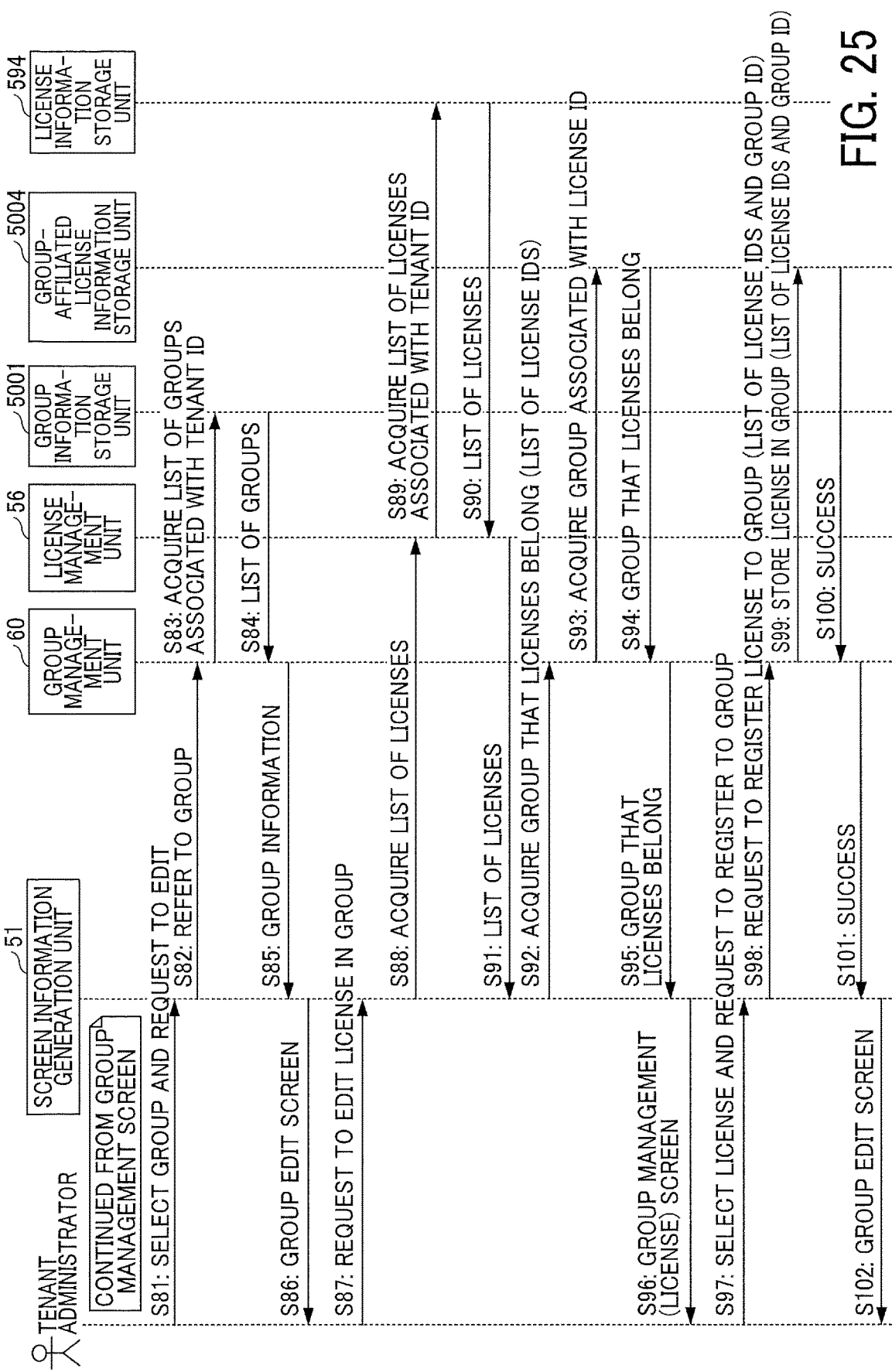
FIG. 25 is a sequence diagram illustrating a process initiated by the tenant administrator or the group administrator to register the license in the group.

FIG. 25 is a sequence diagram illustrating a process initiated by the tenant administrator or the group administrator to register a license in a group.

The process up to displaying the group edit screen in steps S81 to S86 may be the same as in steps S21 to S26 of FIG. 15.

In step S87, the first communication unit 12 of the first terminal device 10 receives the screen information of the group edit screen and the display control unit 13 displays the group edit screen 340. An example of the group edit screen 340 is illustrated in FIG. 16. The tenant administrator or group administrator performs a license edit operation on the group edit screen 340 (presses the license edit button 344). The operation reception unit 14 of the first terminal device 10 accepts the operation. The operation content is transmitted to the information processing system 50.

In step S88, the fifth communication unit 52 of the information processing system 50 receives the license editing request and the screen information generation unit 51 requests a list of licenses from the license management unit 56.

In steps S89 and S90, the license management unit 56 acquires the list of licenses having the same tenant ID as the tenant administrator or group administrator from the license information storage unit 594.

In step S91, the license management unit 56 transmits the list of licenses to the screen information generation unit 51.

In step S92, the screen information generation unit 51 designates a license ID in the list of licenses and requests a group to which the license belongs from the group management unit 60.

In steps S93 and S94, the group-affiliated license management unit 63 of the group management unit 60 acquires the group ID corresponding to the license ID from the group-affiliated license information storage unit 5004.

In step S95, the group-affiliated license management unit 63 transmits the group to which the license belongs to the screen information generation unit 51.

In step S96, the screen information generation unit 51 generates screen information on the group management (license) screen by using the list of licenses and the group to which the license belongs. On the group management (license) screen, when the license belongs to the group selected by the tenant administrator, the license is checked. The screen information generation unit 51 transmits the screen information of the group management (license) screen to the first terminal device 10 through the fifth communication unit 52.

In step S97, the first communication unit 12 of the first terminal device 10 receives the screen information of the group management (license) screen and the display control unit 13 displays the group management (license) screen. FIG. 26 illustrates an example of the group management (license) screen. The tenant administrator selects the license to be registered in the group on the group management (license) screen and performs a registration operation. The operation reception unit 14 of the first terminal device 10 accepts the operation. A list of license IDs of licenses registered in the group and the group ID of the registration destination are transmitted to the information processing system 50.

In step S98, the fifth communication unit 52 of the information processing system 50 receives the license registration request, and the screen information generation unit 51 requests the group management unit 60 to register the license to the group. The list of license IDs of licenses registered in the group and the group ID of the registration destination are transmitted.

In steps S99 and S100, the group-affiliated license management unit 63 of the group management unit 60 stores the license ID and the group ID in association with each other in the group-affiliated license information storage unit 5004. Also, a group-affiliated license ID is numbered and stored.

In step S101, a storage success is transmitted to the screen information generation unit 51.

In step S102, the screen information generation unit 51 generates the group edit screen and transmits the group edit screen to the first terminal device 10 through the fifth communication unit 52.

FIG. 26 is an example of the group management (license) screen 390 displayed by the first terminal device 10. The group management (license) screen 390 is a screen for the tenant administrator to register a license in the group.

The group management (license) screen 390 is a two-dimensional table in which a group name column 392 is displayed in association with a license column 391. The list of licenses belonging to the tenant is displayed in the license column 391. The group name column 392 includes check boxes 393. When a check box 393 is checked, a license corresponding to the check box belongs to the group.

A license for which the horizontal line 394 is displayed on the group management (license) screen 390 is the license that already belongs to another group. Therefore, this license cannot belong to another group. However, it may be made possible for one license to belong to multiple groups.

FIG. 27 is a group-affiliated license (plural groups) screen 420a which is a modified example of the group management (license) screen 390. On the group management (license) screen 390 of FIG. 26, a license is registered for one group selected by the tenant administrator. On the other hand, on the group-affiliated license (plural groups) screen 420 of FIG. 27, license registration is possible for all the groups in the tenant.

On the group-affiliated license (plural groups) screen 420, group columns 422 is displayed together with a license column 421. Check boxes 423 are displayed for each group. The tenant administrator or group administrator can check the check box 423 to register the license. The function of the horizontal line 424 may be the same as that of the group management (license) screen 390.

A process of assigning licenses to the users belonging to the group is described with reference to FIGS. 28 to 30.

Figure 28:
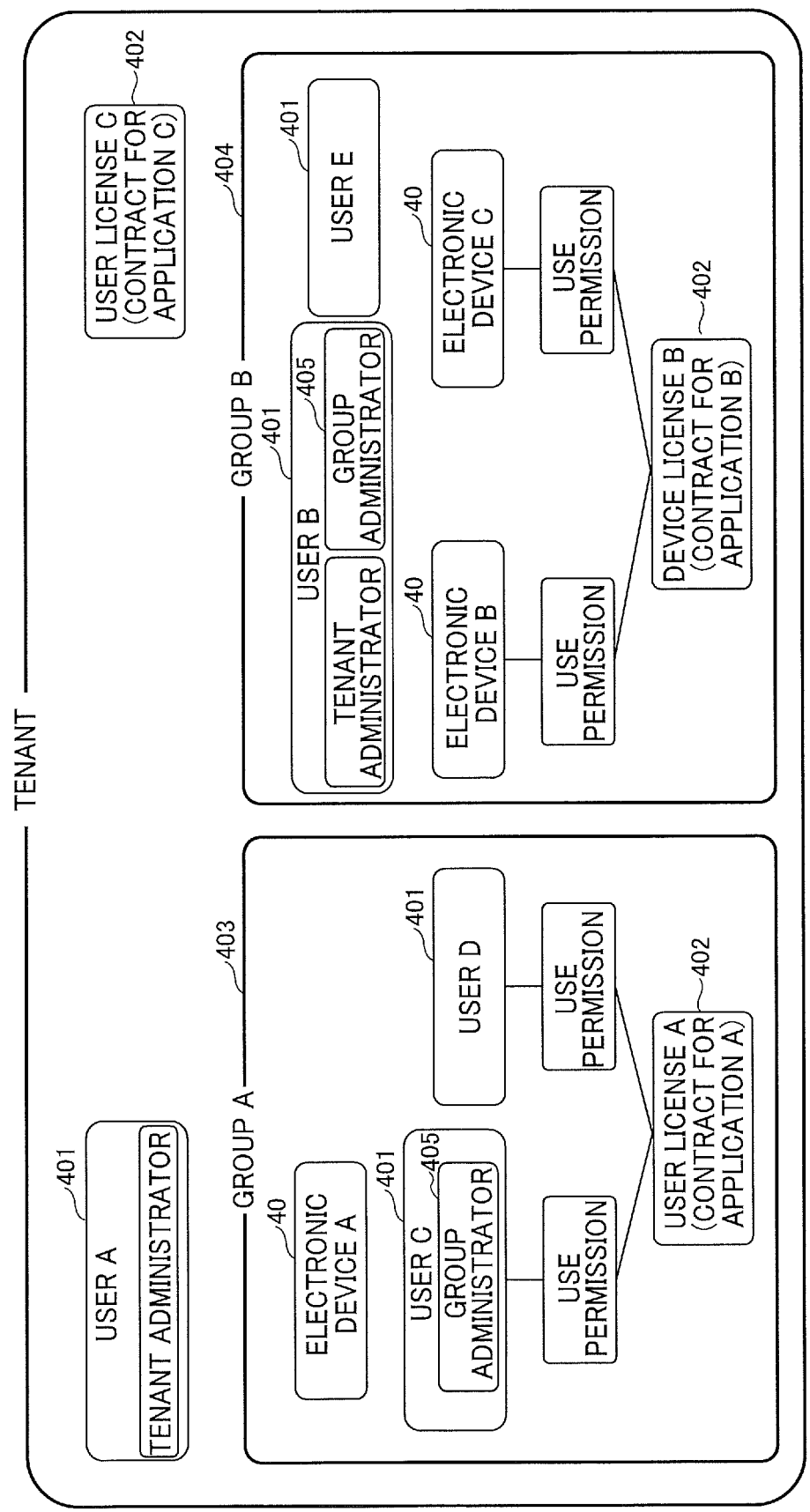
FIG. 28 is a schematic diagram illustrating assigning of licenses to users belonging to the group.

FIG. 28 is a schematic diagram illustrating the assigning of licenses to users belonging to the group. Groups A and B have been created for the tenant of FIG. 28. Users C and D, an electronic device A, and a license A belong to the group A. Users B and E, electronic devices B and C, and a license B belong to the group B.

The tenant administrator or the group administrator can individually assign the use permission to the users and the electronic devices 40 in the group based on the licenses belonging to the group. The tenant administrator or the group administrator can collectively assign use permission to users and electronic devices 40 in the group based on the licenses belonging to the group.

Instead of operation by the tenant administrator or group administrator, the license management unit 56 may automatically assign use permission in response to a user or an electronic device 40 using an application, when a group to which the user or the electronic device 40 belongs has a license.

Figure 29:
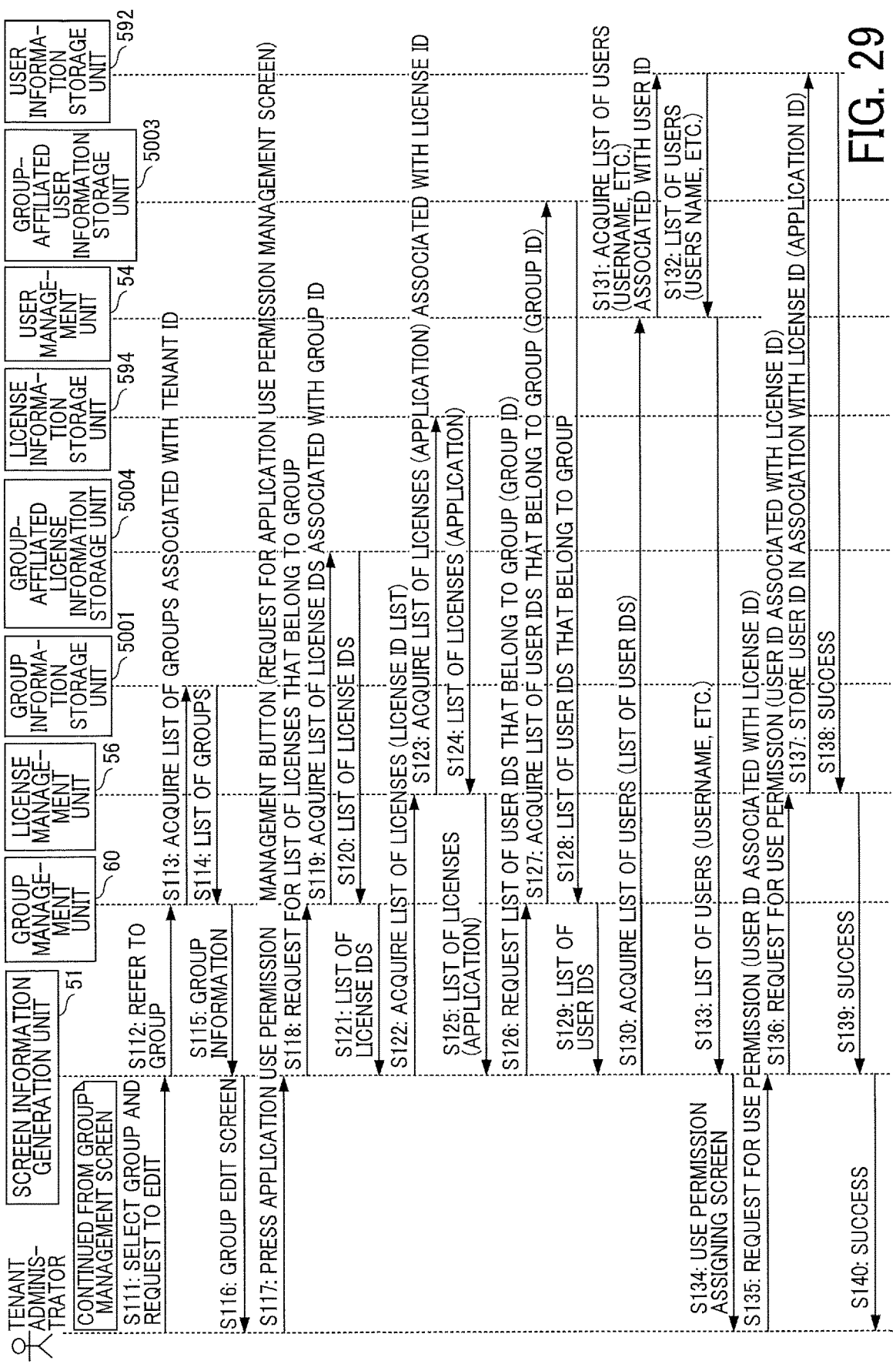
FIG. 29 is a sequence diagram illustrating a process initiated by the tenant administrator or the group administrator to assign the license to a user belonging to the group.

FIG. 29 is a sequence diagram illustrating a process initiated by the tenant administrator or group administrator to assign the license to the user belonging to the group.

The process up to displaying the group edit screen in steps S111 to S116 may be the same as in steps S21 to S26 of FIG. 15.

In step S117, the first communication unit 12 of the first terminal device 10 receives the screen information of the group edit screen and the display control unit 13 displays the group edit screen. An example of the group edit screen is illustrated in FIG. 16. The tenant administrator or group administrator presses the application use permission management button 345 on the group edit screen. The operation reception unit 14 of the first terminal device 10 accepts the pressing of the application use permission management button 345. The operation content is transmitted to the information processing system 50.

In step S118, the fifth communication unit 52 of the information processing system 50 receives a request for assigning the use permission of the application and the screen information generation unit 51 requests a list of licenses belonging to the group from the group management unit 60.

In steps S119 and S120, the group-affiliated license management unit 63 of the group management unit 60 acquires the list of licenses associated with the selected group ID from the group-affiliated license information storage unit 5004.

In step S121, the group-affiliated license management unit 63 transmits the list of licenses to the screen information generation unit 51.

In step S122, the screen information generation unit 51 designates a license ID included in the list of licenses and requests the license management unit 56 for a list of applications.

In steps S123 and S124, the license management unit 56 acquires the list of applications corresponding to the license ID from the license management unit 56.

In step S125, the license management unit 56 transmits the list of applications to the screen information generation unit 51.

In step S126, the screen information generation unit 51 requests a list of user IDs belonging to the group from the group management unit 60.

In steps S127 and S128, the group-affiliated user management unit 61 of the group management unit 60 acquires a list of user IDs associated with the group ID selected by the tenant administrator or the group administrator from the group-affiliated user information storage unit 5003.

In step S129, the group management unit 60 transmits the list of user IDs to the screen information generation unit 51.

In step S130, the screen information generation unit 51 designates the acquired list of user IDs and requests a list of users from the user management unit 54.

In steps S131 and S132, the user management unit 54 acquires the list of usernames and the like associated with the user ID from the user information storage unit 592.

In step S133, the user management unit 54 transmits the list of users to the screen information generation unit 51.

In step S134, the screen information generation unit 51 generates screen information of a use permission assigning screen from the list of applications and the list of users and transmits the screen information to the first terminal device 10 through the fifth communication unit 52. On the use permission assigning screen, a check mark is added to the user who has the use permission of the application.

In step S135, the first communication unit 12 of the first terminal device 10 receives the screen information of the use permission assigning screen and the display control unit 13 displays the use permission assigning screen. An example of the use permission assigning screen is illustrated in FIG. 30. The tenant administrator or group administrator assigns the use permission of the application to the users of the group on the use permission assigning screen. The operation reception unit 14 of the first terminal device 10 accepts the assigning operation. The license ID (application) associated with the user ID is transmitted to the information processing system 50.

In step S136, the fifth communication unit 52 of the information processing system 50 receives a request for assigning the use permission, and the screen information generation unit 51 requests the license management unit 56 to assign the use permission by designating the user ID and the license ID.

In steps S137 and S138, the license management unit 56 designates the user ID and the license ID in association with each other and stores the assignment of use permission in the user information storage unit 592.

In step S139, a storage success is transmitted to the screen information generation unit 51.

In step S140, the screen information generation unit 51 transmits the screen information of the group edit screen to the first terminal device through the fifth communication unit 52 indicating that the storage is successful.

FIG. 30 is a diagram illustrating an example of the use permission assigning screen 430 displayed by the first terminal device 10. The use permission assigning screen 430 is a two-dimensional table of a user column 431 and an application column 432. The user column 431 indicates users belonging to the group, and the application column 432 indicates applications belonging to the group. Only users who belong to the same group and only one or more applications that belong to the same group are displayed for each group.

By checking the check box 433, the tenant administrator or the group administrator can assign the use permission of each application belonging to the group to the users in the group.

In addition, a full selection button 434 and a full release button 435 are displayed in the column of each application. The tenant administrator or the group administrator can collectively assign the license belonging to the group to the users in the group by pressing the full selection button 434.

Since the licenses belonging to the group and the users belonging to the same group are displayed in this way, the use permission can be assigned to the users belonging to the group. In other words, assigning the use permission to users who belong to a group different from the license is restricted.

It is possible to assign the use permission of the application belonging to the group to the users in the same group as the application and in addition, it is possible to prevent assignment of the use permission of the application to the users in a group to which application does not belong.

FIG. 30 is a diagram illustrating the assignment of use permission to the user. The screen for assigning the use permission to the electronic device 40 is also the same. The first terminal device 10 displays a display component for accepting the assignment to the electronic devices of the group to which the application belongs, and a display component for restricting the assignment to the electronic devices of the group to which the application does not belong.

Instead of the tenant administrator assigning the use permission in advance as illustrated in FIG. 30, the license management unit 56 may automatically assign the use permission when a user or an electronic device 40 uses the application, if the group that the user or the electronic device 40 belongs has the license.

When a screen transition is made by pressing the application use permission management (user) button 314 or the application use permission management (device) button 315 of the home screen 310 displayed by the tenant administrator, it is necessary to prevent assigning of use permission across groups, since it is possible to assign use permission across all groups.

Figure 31:
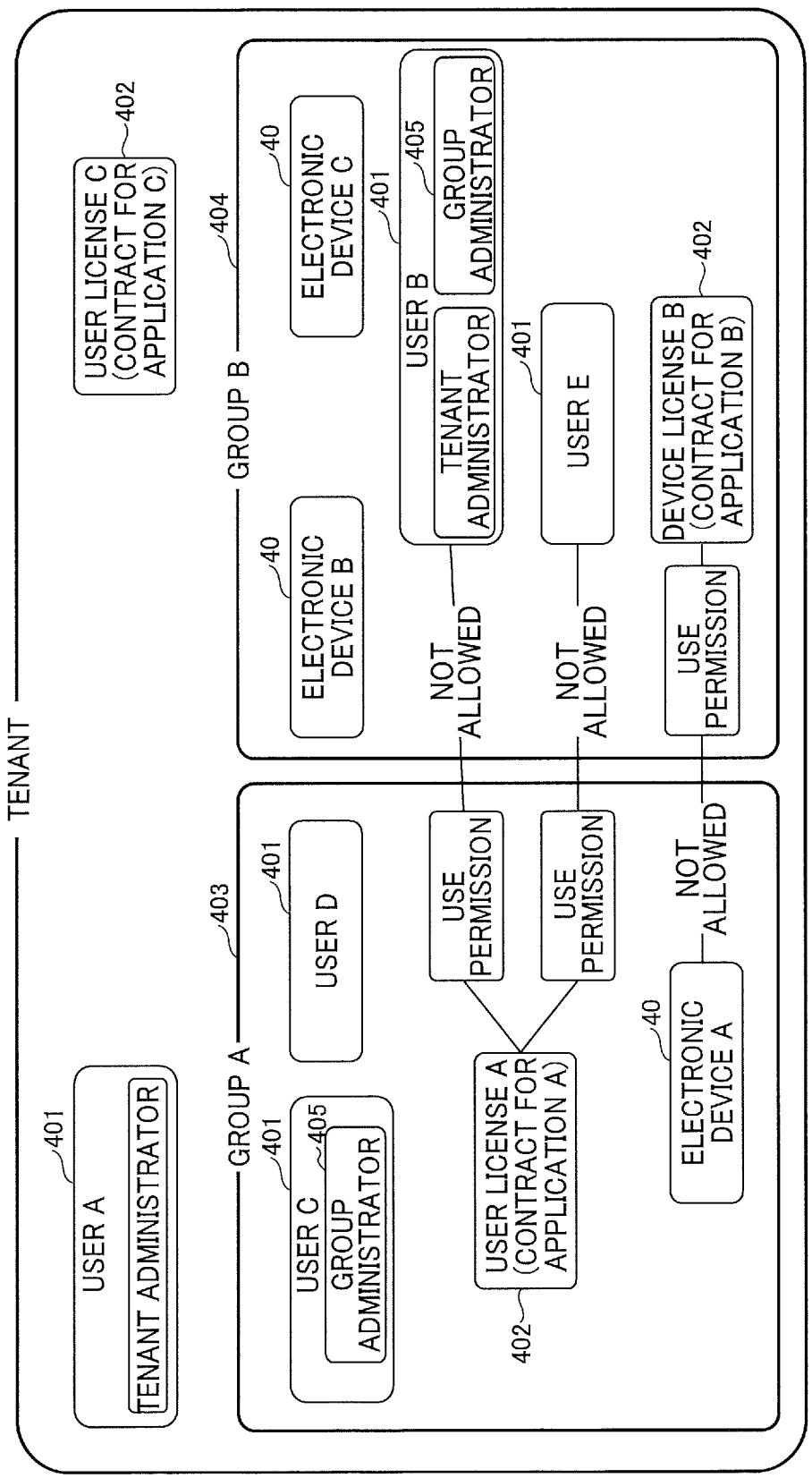
FIG. 31 is a schematic diagram illustrating restricting assignment of license use permission based on groups.

FIG. 31 schematically illustrates restrictions on the assignment of license use permission based on the group. For example, since the license A belongs to the group A, the use permission of the license A is not assigned (restricted) to the users B and E of the group B. Similarly, since the license B belongs to the group B, the use permission of the license B is not assigned (restricted) to the electronic device A of the group A.

When the users C or D registered in the group A and has the use permission of application A assigned attempt to use the application A from the electronic device A registered in the group A and has the use permission of the application A assigned, the information processing system 50 permits the user C or D to use the application A from the electronic device A.

When the user C or D registered in group A and has the use permission of application A assigned attempt to use the application A from the electronic device B registered in another group B to which the use permission of the application A is not assigned, the information processing system 50 does not permit the user C or D to use the application A from the electronic device B.

When the user and the electronic device to which the same application use permission is assigned are registered in the same group, the information processing system 50 permits the user to use the application from the electronic device. If the user and the electronic device have the same application use permission assigned, the user can use the application from the electronic device basically, even if the user and the electronic device are not in the same group, but the information processing system 50 may limit the use of the application by determining whether the user and the electronic device are in the same group.

Figure 32:
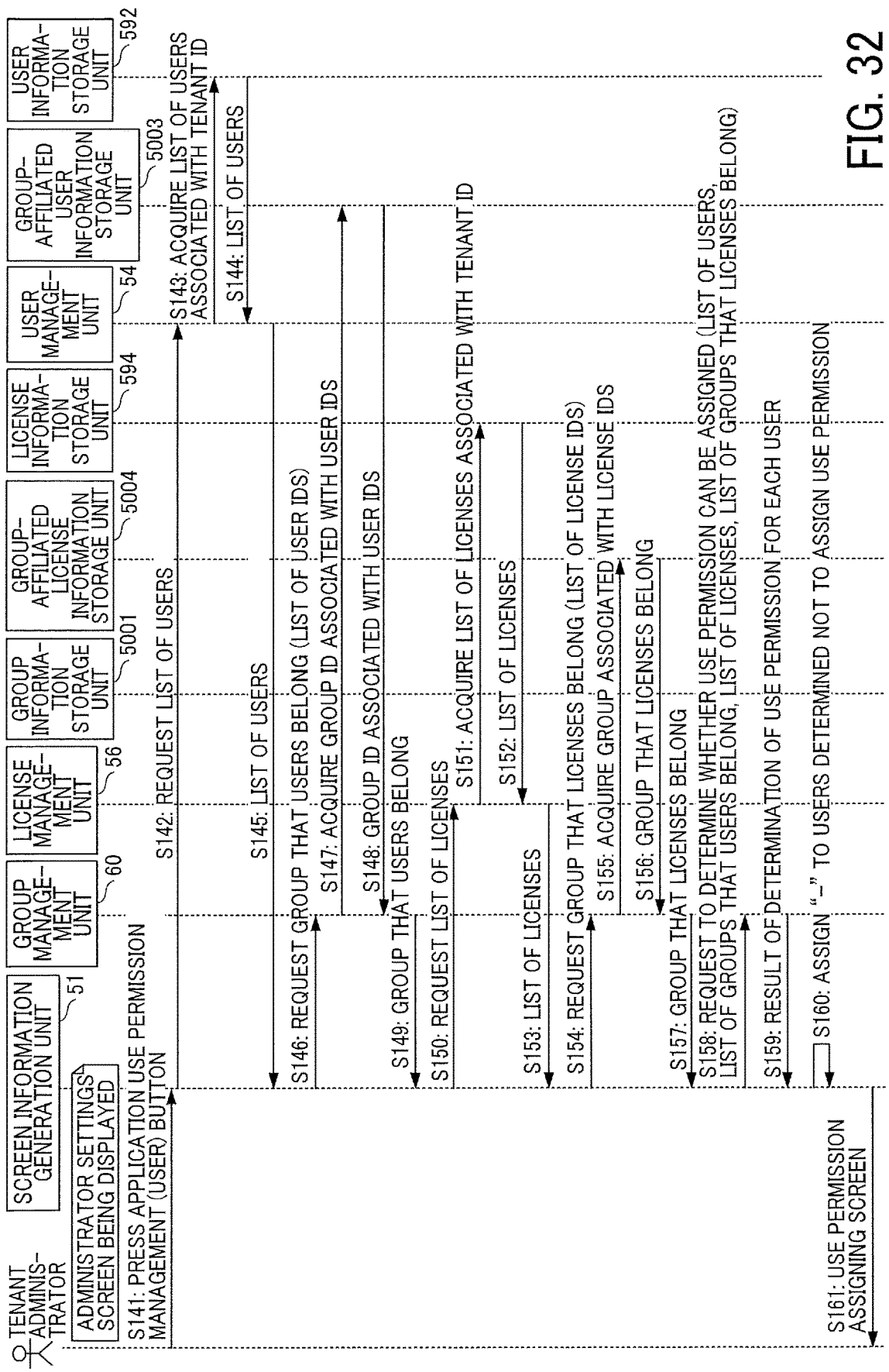
FIG. 32 is a sequence diagram illustrating a process in which the assignment of license use permission is restricted based on the groups.

FIG. 32 is a sequence diagram illustrating a process in which the assignment of license use permission is restricted based on the group. It is assumed that the home screen 310 is displayed on the first terminal device 10.

In step S141, the tenant administrator presses the application use permission management (user) button 314. The operation reception unit 14 of the first terminal device 10 accepts the operation. The operation content is transmitted to the information processing system 50.

In step S142, the fifth communication unit 52 of the information processing system 50 receives the pressing of the application use permission management (user) button 314, and the screen information generation unit 51 designates the tenant ID of the tenant administrator and request a list of users from the user management unit 54.

In steps S143 and S144, the user management unit 54 acquires the list of users associated with the tenant ID from the user information storage unit 592.

In step S145, the user management unit 54 transmits the list of users to the screen information generation unit 51.

In step S146, the screen information generation unit 51 designates a list of user IDs and requests the group to which the user belongs from the group management unit 60.

In steps S147 and S148, the group-affiliated user management unit 61 of the group management unit 60 acquires the group ID associated with the user ID from the group-affiliated user information storage unit 5003.

In step S149, the group management unit 60 transmits the group to which the user belongs to the screen information generation unit 51.

In step S150, the screen information generation unit 51 requests the license management unit 56 for a list of licenses purchased by the tenant to which the tenant administrator belongs.

In steps S151 and S152, the license management unit 56 acquires the list of licenses associated with the tenant ID from the license information storage unit 594.

In step S153, the license management unit 56 transmits the list of licenses to the screen information generation unit 51.

In step S154, the screen information generation unit 51 designates a list of license IDs belonging to the tenant and requests the group to which the licenses belong from the group management unit 60.

In steps S155 and S156, the group-affiliated license management unit 63 of the group management unit 60 acquires the group associated with the license ID from the group-affiliated license information storage unit 5004.

In step S157, the group management unit 60 transmits the group to which the license belongs to the screen information generation unit 51.

In step S158, the screen information generation unit 51 requests the group management unit 60 to determine whether the use permission can be assigned. The list of users, the list of groups to which users belong, the list of licenses, and the list of groups to which licenses belong are transmitted to the group management unit 60.

In step S159, the determination unit 66 of the group management unit 60 compares the list of users, the list of groups to which the user belongs, the list of licenses, and the list of groups to which the license belongs to determine whether to assign use permission for each user. The result is transmitted to the screen information generation unit 51. Details are described with reference to FIG. 33.

In step S160, when the use permission cannot be assigned, the screen information generation unit 51 associates a "-" (horizontal line) with the user and generates the screen information of the use permission assigning screen.

In step S161, the screen information generation unit 51 transmits the screen information of the use permission assigning screen to the first terminal device 10 through the fifth communication unit 52. The first communication unit 12 of the first terminal device 10 receives the screen information of the use permission assigning screen, and the display control unit 13 displays the use permission assigning screen. An example of the use permission assigning screen is illustrated in FIG. 34.

In FIG. 32, the list of the groups to which the user belongs is acquired and when the list of the groups to which the electronic device 40 belong is acquired, the screen information generation unit 51 can generate screen information of a use permission assigning screen in which "-" (horizontal line) is associated with the electronic device 40.

Figure 33:
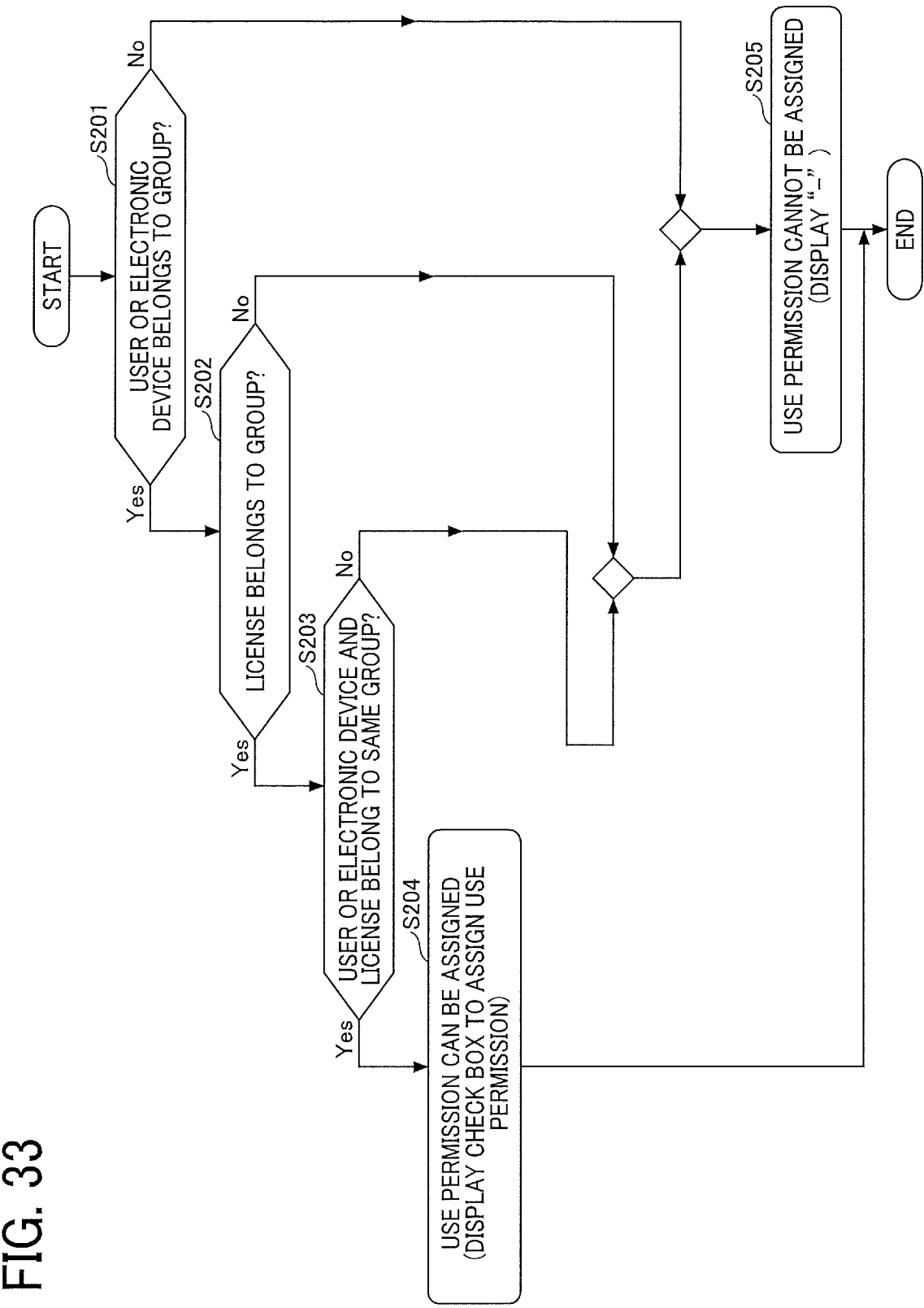
FIG. 33 is a flowchart illustrating a process executed by a determination unit of the group management unit to determine whether use permission can be assigned to a user.

FIG. 33 is a flowchart illustrating a process in which the determination unit 66 of the group management unit 60 determines whether the use permission can be assigned to a user.

In step S201, the determination unit 66 determines whether each user or electronic device 40 belongs to a group based on the list of groups to which the user belongs. In step S205, a horizontal line is displayed for a user who does not belong to any group.

In step S202, when each user or electronic device 40 belongs to a group, the determination unit 66 determines whether the license belongs to the group based on the list of groups to which the license belongs. In step S205, the horizontal line is displayed for a license that does not belong to any group.

In step S203, when the user and the license belong to a group, the determination unit 66 determines whether the user and the license belong to the same group.

In step S204, when the user and the license belong to the same group, the determination unit 66 determines that the use permission can be assigned to the user.

FIG. 34 is an example of the use permission assigning screen displayed by the first terminal device 10. On the use permission assigning screen 440, all users belonging to the tenant are displayed in the user column 441. As determined in step S203 of FIG. 33, a horizontal line 444 (an example of a display component indicating that use permission cannot be assigned) is displayed unless the license and the user are in the same group. As a result, assigning the use permission of the license of the group to the user who does not belong to the group can be prevented. In other words, the first terminal device 10 displays a check box 443 (an example of a display component that can accept assigning use permission) only to a user who belongs to the same group as the license to enable assignment of the use permission.

It is possible to assign the application use permission assigned to the group to a user in the same group as the application, and in addition, it is possible to limit an assignment of application use permission to a user in a group to which application does not belong.

Further, as determined in step S202 of FIG. 33, use permission of a license that does not belong to any group cannot be assigned to any user or electronic device 40. In this case, horizontal lines 444 are displayed on all the columns of a certain application.

Further, as determined in step S201 of FIG. 33, the use permission of any license is not assigned to the user or the electronic device 40 that does not belong to any group. In this case, the horizontal lines 444 are displayed on all the columns of the corresponding user or electronic device 40 (if the user does not belong to the group or the application does not belong to the group, the assignment of use permission for the application is restricted).

As described above, in the service providing system of the present embodiment, the use permission of an application is assigned to the user or the electronic device belonging to the licensed group. Therefore, the use permission can be managed for each group in the tenant.

The above-described embodiment is illustrative and do not limit the present invention. Thus, numerous additional modifications and variations are possible in light of the above teachings within the scope of the present invention. Any one of the above-described operations may be performed in various other ways, for example, in an order different from the one described above.

For example, in the present embodiment, each terminal device uses a general-purpose web browser, but a dedicated application may be used for the information processing system 50.

Further, the configuration examples illustrated in FIG. 6 and the like are divided according to the main functions in order to facilitate the understanding of the processing by the first terminal device 10, the third terminal device 30, the electronic device 40, and the information processing system 50. The present disclosure is not limited by the way of dividing the processing unit or the name. The processing of the first terminal device 10, the second terminal device 20, the third terminal device 30, the electronic device 40, and the information processing system 50 can be divided into more processing units according to the processing content. Further, one processing unit can be divided so as to include more processing.

The apparatuses described in the examples are merely an illustration of one of several computing environments for implementing the embodiments disclosed herein. In some embodiments, information processing system 50 includes multiple computing devices, such as a server cluster. The plurality of computing devices is configured to communicate with one another through any type of communication link, including a network, shared memory, etc., and perform the processes disclosed herein.

Further, the information processing system 50 can be configured to share the disclosed processing steps, for example, the sequence diagram of FIG. 15 and the like in various combinations. For example, a process executed by a given unit may be executed by a plurality of information processing apparatuses included in the information processing system 50. Further, the information processing system 50 may be integrated into one server device or may be divided into a plurality of devices.

Each function of the embodiments described above can be implemented by one or a plurality of processing circuitry.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:
1. A service providing system comprising:
an information processing system; and
a terminal device communicably connected to the information processing system;
the information processing system including circuitry configured to:
register one or more groups in a tenant;
assign application use permission for an application among applications available in the tenant to a specific group among the one or more groups;
generate screen information for assigning the application use permission assigned to the specific group to a user, with a user list screen configured such that a user who belongs to the specific group among users who belong to the tenant is selectable to assign the application use permission and a user who does not belong to the specific group among the users who belong to the tenant is not selectable to assign the application use permission;
transmit the screen information to the terminal device in a case where a tenant administrator used the terminal device to log in to the information processing system;
acquire a list of users having a same tenant ID as the tenant administrator and cause the terminal device to display the list of users;
allow the tenant administrator to select a user from the list of users and receive a user ID of the selected user;
add the user ID to the specific group;
acquire a list of application use permission associated with the same tenant ID;
cause the terminal device to display a list of applications to which the specific group has application use permission;
allow the tenant administrator to select an application from the list of applications and receive an application ID of the selected application;
register the selected application to the specific group by associating the received application ID;
cause the terminal device to display a use permission assigning screen for displaying the application to which the specific group has application use permission and a selected user of the specific group in association with each other;
accept an assigning operation by the tenant administrator on the use permission assigning screen to assign application use permission of the application to the selected user of the specific group, and receive a user ID of the selected user and the application ID of the application;
store the user ID and the application ID in association with each other;
permit use of the application to the selected user of the specific group to whom the application use permission is assigned; and
restrict a user to whom the application use permission is not assigned from using the application.
2. The service providing system of claim 1, wherein the terminal device includes circuitry configured to:
display on a display, a display component for accepting assignment of the application use permission to the selected user of the specific group to whom the application use permission is assigned; and
display on the display, a display component for restricting the assignment of the application use permission to the user to whom the application use permission is not assigned.

3. The service providing system of claim 1, wherein the circuitry of the information processing system is further configured to:
store in one or more memories, information on one or more users belonging to the one or more groups and information on one or more applications belonging to the one or more groups; and
generate screen information for restricting an assignment of the application use permission when a user and an application do not belong to a same group among the one or more groups.

4. The service providing system of claim 3, wherein the circuitry of the information processing system is configured to generate the screen information for restricting the assignment of the application use permission when the user does not belong to the specific group or when the application does not belong to the specific group.

5. The service providing system of claim 1, wherein the circuitry of the information processing system is further configured to:
assign the application use permission assigned to the specific group to an electronic device belonging to a same group as the application; and
generate screen information for restricting an assignment of the application use permission to an electronic device belonging to another group to which the application is not assigned.

6. The service providing system of claim 5, wherein the circuitry of the information processing system is configured to:
display a display component for accepting the assignment of the application use permission on a display of the electronic device belonging to the specific group to which the application use permission is assigned; and
display a display component for restricting the assignment of the application use permission on the display of the electronic device belonging to the other group to which the application use permission is not assigned.

7. The service providing system of claim 3, wherein the circuitry of the information processing system is further configured to:
display on a display, one or more users who belong to the same group and one or more applications that belong to the same group; and
display on the display, a display component for accepting the assignment of the application use permission to each user.

8. The service providing system of claim 3, wherein the circuitry of the information processing system is further configured to:
display on a display, one or more electronic devices belonging to the same group and one or more applications belonging to the same group; and
display on the display, a display component for accepting the assignment of the application use permission to each electronic device.

9. The service providing system of claim 5, wherein the circuitry of the information processing system is further configured to:
permit the selected user of the specific group to whom the application use permission is assigned, to use the application from the electronic device registered in the same group as the application and has the application use permission assigned; and
restrict the selected user of the specific group to whom the application use permission is assigned, to use the application from the electronic device registered in the other group to which the application use permission is not assigned.

10. The service providing system of claim 1, wherein the circuitry of the information processing system is further configured to:
generate screen information for displaying a display component for accepting registration to the specific group in association with each user belonging to the tenant; and
the terminal device includes circuitry configured to:
display on a display, a screen displaying the display component for accepting registration to the specific group in association with each user belonging to the tenant.

11. The service providing system of claim 10, wherein the circuitry of the information processing system is further configured to:
store in one or more memories, information on each user belonging to the specific group; and
when the selected user belonging to the tenant already belongs to the specific group, generate screen information for displaying a display component for restricting registration to another group in association with each user belonging to the tenant.

12. An information processing system comprising:
circuitry configured to:
register one or more groups in a tenant;
assign application use permission for an application among applications available in the tenant to a specific group among the one or more groups;
generate screen information for assigning the application use permission assigned to the specific group to a user, with a user list screen configured such that a user who belongs to the specific group among users who belong to the tenant is selectable to assign the application use permission and a user who does not belong to the specific group among the users who belong to the tenant is not selectable to assign the application use permission;
transmit the screen information to a terminal device by which a tenant administrator used to log in to the information processing system;
acquire a list of users having a same tenant ID as the tenant administrator and cause the terminal device to display the list of users;
allow the tenant administrator to select a user from the list of users and receive a user ID of the selected user;
add the user ID to the specific group;
acquire a list of application use permission associated with the same tenant ID;
cause the terminal device to display a list of applications to which the specific group has application use permission;
allow the tenant administrator to select an application from the list of applications and receive an application ID of the selected application;
register the selected application to the specific group by associating the received application ID;
cause the terminal device to display a use permission assigning screen for displaying the application to which the specific group has application use permission and a selected user of the specific group in association with each other;
accept an assigning operation by the tenant administrator on the use permission assigning screen to assign application use permission of the application to the selected user of the specific group, and receive a user ID of the selected user and the application ID of the application;

store the user ID and the application ID in association with each other;

permit use of the application to the selected user of the specific group to whom the application use permission is assigned; and restrict a user to whom the application use permission is not assigned from using the application.

13. A use permission assigning method performed by an information processing system, the method comprising:

registering one or more groups in a tenant;

assigning application use permission for an application among applications available in the tenant to a specific group among the one or more groups;

generating screen information for assigning the application use permission assigned to the specific group to a user, with a user list screen configured such that a user who belongs to the specific group among users who belong to the tenant is selectable to assign the application use permission and a user who does not belong to the specific group among the users who belong to the tenant is not selectable to assign the application use permission;

transmitting the screen information to a terminal device by which a tenant administrator used to log in to the information processing system;

acquiring a list of users having a same tenant ID as the tenant administrator and causing the terminal device to display the list of users;

allowing the tenant administrator to select a user from the list of users and receiving a user ID of the selected user;

adding the user ID to the specific group;

acquiring a list of application use permission associated with the same tenant ID;

causing the terminal device to display a list of applications to which the specific group has application use permission;

allowing the tenant administrator to select an application from the list of applications and receiving an application ID of the selected application;

registering the selected application to the specific group by associating the received application ID;

causing the terminal device to display a use permission assigning screen for displaying the application to which the specific group has application use permission and a selected user of the specific group in association with each other;

accepting an assigning operation by the tenant administrator on the use permission assigning screen to assign application use permission of the application to the selected user of the specific group, and receiving a user ID of the selected user and the application ID of the application;

storing the user ID and the application ID in association with each other;

permitting use of the application to the selected user of the specific group to whom the application use permission is assigned; and restricting a user to whom the application use permission is not assigned from using the application.

\* \* \* \* \*